United States Patent
Son et al.

(10) Patent No.: US 9,491,697 B2
(45) Date of Patent: Nov. 8, 2016

(54) TERMINAL, CONTROL METHOD FOR SAME, AND CONTROL PROGRAM FOR SAME

(71) Applicant: SoftBank Mobile Corp., Minato-ku, Tokyo (JP)

(72) Inventors: Masayoshi Son, Minato-ku (JP);
Hironobu Tamba, Minato-ku (JP);
Masayuki Doi, Minato-ku (JP);
Takafumi Okaniwa, Minato-ku (JP);
Hitoshi Tsuchiya, Minato-ku (JP);
Younpyo Hong, Minato-ku (JP);
Yasuhiro Noda, Minato-ku (JP)

(73) Assignee: SOFTBANK CORP., Minato-ku (JP)

( * ) Notice: Subject to any disclaimer, the term of this patent is extended or adjusted under 35 U.S.C. 154(b) by 0 days.

(21) Appl. No.: 14/404,828

(22) PCT Filed: Apr. 12, 2013

(86) PCT No.: PCT/JP2013/061101
§ 371 (c)(1),
(2) Date: Dec. 1, 2014

(87) PCT Pub. No.: WO2013/183364
PCT Pub. Date: Dec. 12, 2013

(65) Prior Publication Data
US 2015/0146703 A1 May 28, 2015

(30) Foreign Application Priority Data

Jun. 8, 2012 (JP) .................................. 2012-131412
Sep. 25, 2012 (JP) .................................. 2012-211260

(51) Int. Cl.
*H04W 48/20* (2009.01)
*H04W 48/16* (2009.01)
*H04W 84/12* (2009.01)

(52) U.S. Cl.
CPC ............. *H04W 48/20* (2013.01); *H04W 48/16* (2013.01); *H04W 84/12* (2013.01)

(58) Field of Classification Search
CPC ... H04W 48/16; H04W 48/20; H04W 84/12; H04W 84/18; H04W 4/005; H04W 48/04; H04W 48/02
USPC ............. 370/338, 252, 435.2, 329, 331, 328
See application file for complete search history.

(56) References Cited

U.S. PATENT DOCUMENTS 7,573,846 B2 * 8/2009 Rue .......................... H04L 29/06
370/232
2008/0192699 A1 * 8/2008 Rue ........................ H04W 36/30
370/331

(Continued)

FOREIGN PATENT DOCUMENTS

JP   2001-285922   10/2001
JP   2010-074320   4/2010

(Continued)

OTHER PUBLICATIONS

English translation of Office action mailed Mar. 12, 2013 in corresponding JP Patent Application No. 2012-131412, 3pp.

(Continued)

*Primary Examiner* — Anh Ngoc Nguyen
*Assistant Examiner* — Syed M Bokhari
(74) *Attorney, Agent, or Firm* — Lewis Roca Rothgerber Christie LLP

(57) ABSTRACT

The terminal according to the present application includes: a communication module for scanning to detect accessible access points and connecting to one of the accessible access points; and a connection controller for targeting an identical accessible access point, which has been consecutively detected by a predetermined number of times of scans at predetermined time intervals among the accessible access points, for connection.

6 Claims, 14 Drawing Sheets

(56) References Cited

U.S. PATENT DOCUMENTS

| | | | |
|---|---|---|---|
| 2008/0219208 A1* | 9/2008 | Adams | H04W 48/20 370/328 |
| 2010/0075674 A1* | 3/2010 | Lee | H04W 48/20 455/435.2 |
| 2012/0172045 A1 | 7/2012 | Fukuta | |
| 2012/0263059 A1* | 10/2012 | Kim | H04W 36/0088 370/252 |

FOREIGN PATENT DOCUMENTS

| | | |
|---|---|---|
| JP | 2011-082942 | 4/2011 |
| JP | 2011-097278 A | 5/2011 |
| JP | 2012-028881 A | 2/2012 |
| WO | WO 2011/020481 A1 | 2/2011 |

OTHER PUBLICATIONS

English translation of Office action mailed Jun. 18, 2013 in corresponding JP Patent Application No. 2012-131412, 3pp.

International Search Report for corresponding International Application No. PCT/JP2013/061101, mailed Jun. 25, 2013, 1pg.

* cited by examiner

TERMINAL, CONTROL METHOD FOR SAME, AND CONTROL PROGRAM FOR SAME

CROSS-REFERENCE TO RELATED APPLICATION

This application is a National Phase Patent Application and claims the priority of International Application Number PCT/JP2013/061101, filed on Apr. 12, 2013, which claims priority of Japanese Patent Application Number JP 2012-131412, filed on Jun. 8, 2012 and Japanese Patent Application No. JP 2012-211260, filed on Sep. 25, 2012. The disclosures of which are hereby incorporated by reference.

TECHNICAL FIELD

Embodiments discussed in the present specification relate to a terminal having a wireless LAN communication capability, a method for controlling the terminal, and a program for controlling the terminal.

BACKGROUND

In recent years, various portable terminals, including personal computers, such as mobile phones and portable game machines have normally carried wireless LAN (Local Area Network) communication capabilities (for example, see Patent Literature 1).

It is specified in a wireless communication system with the IEEE (Institute of Electrical and Electronics Engineers) 802.11 specification that when a portable terminal is intended to be connected to the Internet or the like via an access point, a predetermined procedure called an association between the portable terminal and the access point is performed to allow the access point to identify the presence of the portable terminal.

FIG. 13 is a view illustrating an example of the operating sequence of such a conventional wireless LAN communication system.

The portable terminal broadcasts a probe request including the ESSID (Extended Service Set Identifier) of a network to be connected (step S1300).

The access point replies a probe response when the ESSID included in the received probe request is the same as the ESSID thereof (step S1302). The probe response includes parameters such as the BSSID (Basic Service Set Identifier) of the access point, an encryption method, an authentication method, and a transmission speed.

The portable terminal sends an authentication request to the access point (step S1304).

The access point determines whether or not to authenticate the portable terminal using a predetermined algorithm and replies an authentication response including the results (step S1306). Authentication is carried out generally using the MAC (Media Access Control) address of the portable terminal as an identifier.

The portable terminal confirms the authentication by the access point and then sends an association (connection) request to the access point (step S1308). The association request includes parameters such as ESSID, a support rate, and necessity of poling utilization.

The access point confirms that all the parameters included in the received association request which is an authenticated MAC address are associated with the access point and then sends an association response (step S1310).

Based on the above procedure, the portable terminal can send a data frame (step S1312).

CITATION LIST

Patent Literature

Patent Literature 1: Japanese Laid-open Patent Publication No. 2011-259159

SUMMARY

Technical Problem

In general, when a plurality of access points are present, a portable terminal scans all channels and attempt to connect to the access point with the strongest signal. Even during communication, when an access point with a signal stronger than that of the current access point is detected, the portable terminal attempt to connect to the access point with the stronger signal. Thus, when a plurality of access points are present within a short distance, a portable terminal may frequently switch a connection point, and smooth communication may be prevented.

For example, when a user moves by a vehicle, such as a train, a bus, or a taxi, that can move at high speed and can move to the outside of the service area of an access point in a short time, a portable terminal may switch a connection point so as to make a connection to an access point in the vehicle during travel and to make a connection to an access point (with a stronger signal) outside the vehicle during stop. However, frequent repetition of start and stop of the vehicle may have resulted in frequent switching of the connection point and in prevention of smooth communication.

Accordingly, it is an object of the disclosed terminal, method for controlling the terminal, and program for controlling the terminal to solve such conventional problems and to communicate smoothly through a wireless LAN.

Solution to Problem

According to an aspect of the terminal, there is provided a terminal which is capable of connecting by radio to an access point of a wireless LAN. The terminal includes: a communication module for scanning to detect accessible access points and connecting to one of the accessible access points; and a connection controller for targeting an identical accessible access point, which has been consecutively detected by a predetermined number of times of scans at predetermined time intervals among the accessible access points, for connection.

According to an aspect of the terminal, the terminal further includes a sensor for outputting data relating to movement of a user carrying the terminal; and a status detector for determining whether the user is in a movement status based on the data outputted by the sensor, wherein the connection controller targets an identical accessible access point, which has been consecutively detected by a predetermined number of times of scans at predetermined time intervals among the accessible access points, for connection, when it is determined that the user is in a movement status.

According to an aspect of the terminal, the movement status is a status of moving by a moving means which can move to the outside of a service area of an access point within a predetermined time determined based on the predetermined time intervals and the predetermined number of times.

According to an aspect of the terminal, the status detector determines whether the user is in a movement status when disconnection of connection with the access point is detected in a case where a function of connection to a wireless LAN is enabled.

According to an aspect of the terminal, the status detector activates the sensor when a predetermined status detection starting condition is satisfied.

According to an aspect of the terminal, the status detector stops the sensor when a predetermined status detection termination condition is satisfied.

According to an aspect of the terminal, the connection controller further targets an accessible access point, which belongs to a predetermined network among the accessible access points, for connection.

According to an aspect of the terminal, the connection controller further targets an accessible access point, which has been connected in the past among the accessible access points, for connection.

According to an aspect of the terminal, the connection controller targets all of the accessible access points for connection when a predetermined time has passed since the latest status detection by the status detector.

According to an aspect of the method, there is provided a method for controlling a terminal which is capable of connecting by radio to an access point of a wireless LAN. The method includes detecting a first group of accessible access points by scanning; detecting a second group of accessible access points by scanning again after a predetermined time has passed; and connecting to one of the identical accessible access points included in both of the first group and the second group.

According to an aspect of the program, there is provided a program for controlling a terminal which is capable of connecting by radio to an access point of a wireless LAN, wherein the program causes the terminal to execute a process. The process includes detecting a first group of accessible access points by scanning; detecting a second group of accessible access points by scanning again after a predetermined time has passed; and connecting to one of the identical accessible access points included in both of the first group and the second group.

Advantageous Effects of Invention

The terminal, method for controlling the terminal, and program for controlling the terminal scan a predetermined number of times at predetermined time intervals, connect to an identical access point which has been consecutively detected, and maintain the connection to the access point. Therefore, the terminal, method for controlling the terminal, and program for controlling the terminal can communicate smoothly.

DESCRIPTION OF EMBODIMENTS

Various embodiments will be explained below with reference to the drawings. However, it should be noted that the technical scope of this application is not limited to the embodiments but includes the invention as defined by the claims and equivalents thereof.

First Embodiment

In the present embodiment, a user moves by a vehicle (hereinafter referred to as "predetermined vehicle"), such as a train, a bus, or a taxi, that can move at not less than a predetermined velocity and can move to the outside of the service area of an access point within a predetermined time (for example, within t×(n−1) minutes in the case of executing scans n times at intervals of t minutes) and makes a connection from a portable terminal to a wireless LAN during the movement.

Figure 1:
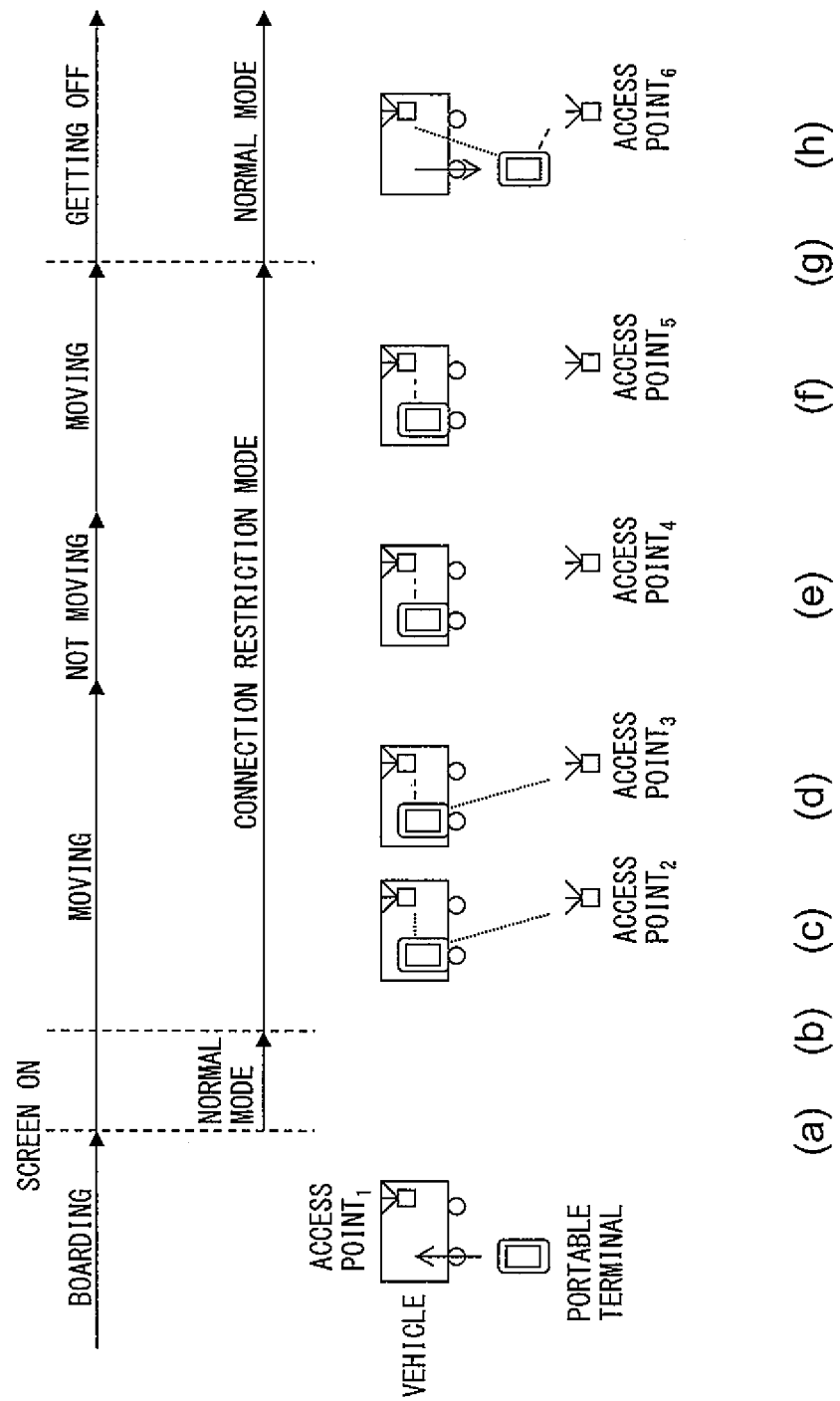
FIG. 1 is a view illustrating an example of a possible situation.

FIG. 1 is a view illustrating an example of such a situation.

The user rides in the vehicle carrying the portable terminal. It is assumed that the portable terminal's function of connection to the wireless LAN is enabled. After the vehicle starts, the user switches the screen of the portable terminal on by, e.g., pressing a button (time (a)).

The portable terminal judges whether or not the user is in the status of moving by the predetermined vehicle (hereinafter referred to as "movement status"). When it is judged that the user is in the movement status, the portable terminal shifts to a connection restriction mode (time (b)).

In the connection restriction mode, the portable terminal executes a scan to detect a neighboring accessible access point. Although a portable terminal attempts to connect to the access point with the strongest signal in a normal procedure, the portable terminal in accordance with the present invention merely records access points and does not attempt to connect to any access point (time (c)).

After a predetermined time (for example, 2 minutes) has passed since the previous scan, the portable terminal executes a scan again to detect a neighboring accessible access point. If the number of times of scans is less than a predetermined number of times (for example, twice), the portable terminal records access points and then executes the above-mentioned procedure again. On the other hand, when the number of times of scans is not less than the predetermined number of times, the portable terminal verifies access points detected in each scan and attempts to connect to an identical access point detected in all the scans (hereinafter referred to as "fixed access point") (time (d)).

Once a connection to the fixed access point is established, the portable terminal does not attempt to connect to any access point other than the fixed access point even if an access point with a stronger signal is detected in a scan after the next time (times (e) and (f)).

The vehicle reaches a destination, and thereafter the user gets off the vehicle and moves. The portable terminal regularly judges whether or not the user is in a movement status. When it is judged that the user is in the status of moving by moving means (for example, on foot) other than the predetermined vehicle and is not in the movement status, the portable terminal shifts to a normal mode (time (g)).

In the normal mode, when the portable terminal has made a connection to an access point, the portable terminal disconnects the connection and then attempts to connect to an access point in a normal procedure. In other words, the portable terminal executes a scan, detects neighboring accessible access points, and attempts to connect to the access point with the strongest signal (time (h)).

Figure 2:
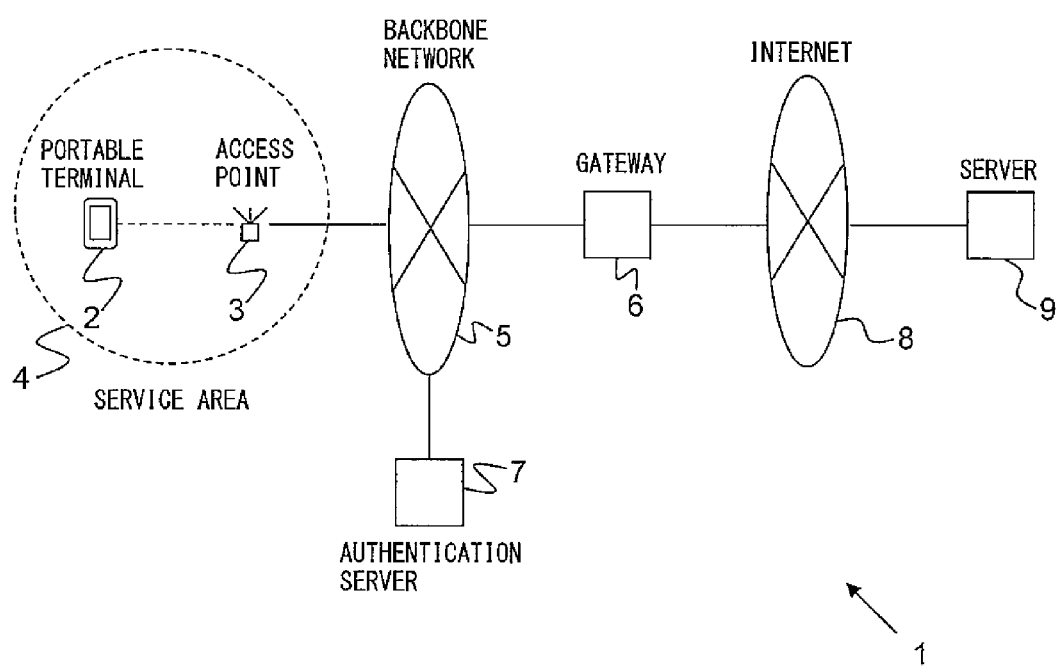
FIG. 2 is a view illustrating an example of the schematic configuration of a wireless LAN communication system.

FIG. 2 is a view illustrating an example of the schematic configuration of a wireless LAN communication system 1.

The wireless LAN communication system 1 includes a portable terminal 2 having a wireless LAN communication capability and an access point 3 for a wireless LAN. The portable terminal 2 can perform wireless communication with the access point 3 in a service area 4 thereof.

The access point 3 is connected to a backbone network 5. An authentication server 7 for authenticating a user for the portable terminal 2 is connected to the backbone network 5 through a wired LAN such as Ethernet (registered trademark).

The user is authenticated by the authentication server 7, whereby the portable terminal 2 can make a connection to the Internet 8 through a gateway 6 that relays the backbone network 5 and the Internet 8. Thus, the portable terminal 2 can communicate with the server 9 connected to the Internet 8.

Figure 3:
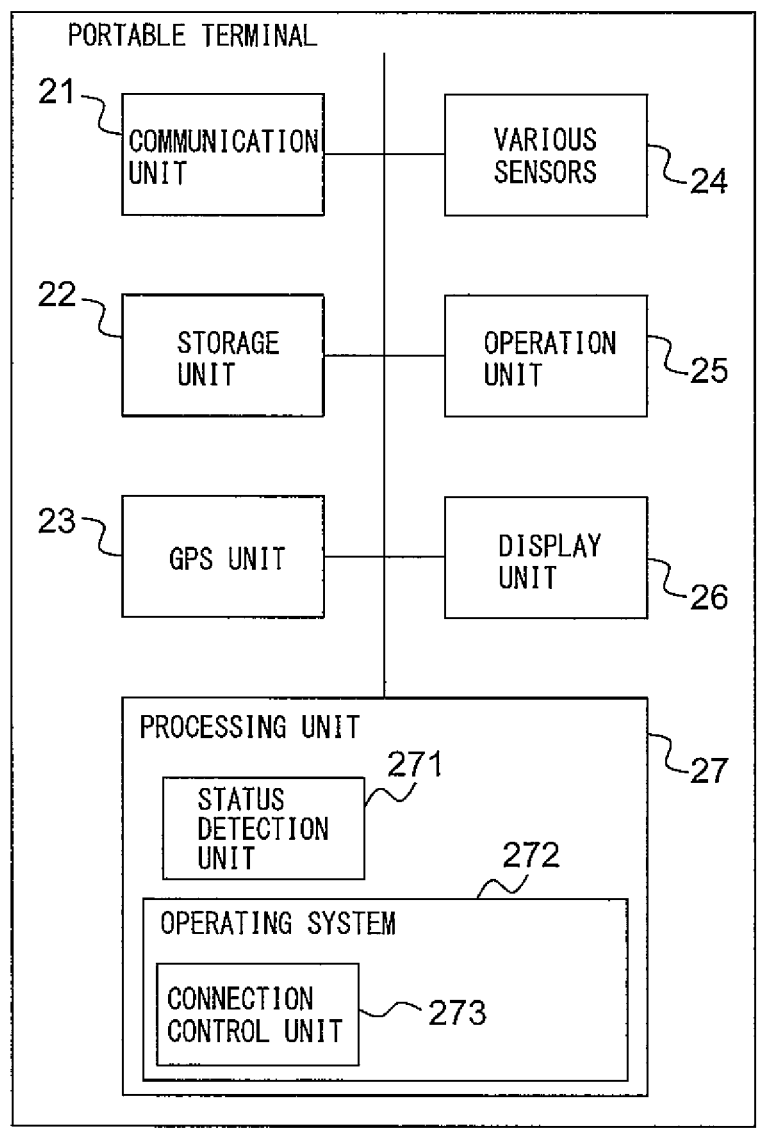
FIG. 3 is a view indicating an example of the schematic configuration of a portable terminal.

FIG. 3 is a view illustrating an example of the schematic configuration of the portable terminal 2.

The portable terminal 2 makes a connection to the server 9 through the access point 3, the backbone network 5, the gateway 6, and the Internet 8, and communicates with the server 9. In addition, the portable terminal 2 detects the location, status, and the like of the user. Therefore, the portable terminal 2 includes a communication unit 21, a storage unit 22, a GPS (Global Positioning System) unit 23, various sensors 24, an operation unit 25, a display unit 26, and a processing unit 27.

The communication unit 21 includes a communication interface circuit including an antenna with the major reception band frequency of the 2.4-GHz band, and connects the portable terminal 2 to the backbone network 5. The communication unit 21 establishes a wireless communication circuit based on the wireless communication system with the IEEE 802.11 specification with the access point 3, and communicates with the access point 3. The communication unit 21 gives data received from the access point 3 to the processing unit 27. The communication unit 21 sends data given by the processing unit 27 to the access point 3.

The storage unit 22, for example, includes at least any one of a semiconductor memory, a magnetic disk apparatus, and an optical disk apparatus. The storage unit 22 stores a driver program, an operating system program, an application program, data, and the like used in a process in the processing unit 27. For example, the storage unit 22 stores an input device driver program that controls the operation unit 25, an output device driver program that controls the display unit 26, and the like as driver programs. In addition, the storage unit 22 stores a connection control program that executes the wireless communication system with the IEEE 802.11 specification, and the like as operating system programs. In addition, the storage unit 22 stores a status detection program that judges whether or not the user is in a movement status, a web browser program that acquires and displays a web page, an electronic mail program that sends and receives electronic mail, and the like as application programs. In addition, the storage unit 22 stores data that indicates the status of the user, i.e., whether or not the user is in a movement status, the number of times of scans, the BSSID of the access point 3, the BSSID of the fixed access point 3, video data, image data, and the like as data. Further, the storage unit 22 may store transitory data according to a predetermined process transiently.

The GPS unit 23 includes a GPS circuit including an antenna with the major reception band frequency of the 1.5-GHz band, and receives a GPS signal from a GPS satellite which is not illustrated. The GPS unit 23 decodes the GPS signal and acquires time information and the like. In addition, the GPS unit 23 calculates a pseudo distance from the GPS satellite to the portable terminal 2 based on the time information and the like, and solves simultaneous equations obtained by substituting the pseudo distance, to thereby calculate the position (latitude, longitude, height, and the like) of the portable terminal 2 and an error. Output data from the GPS unit 23 is utilized with output data from the various sensors 24 for detecting the status of the user by the processing unit 27.

The various sensors 24, which output data indicating the acceleration, inclination, vibration, direction, and the like of the user, are, for example, acceleration sensors, geomagnetic sensors, and the like. Output data from the various sensors 24 is utilized for detecting the status of the user by the processing unit 27.

The operation unit 25 may be any device such as, for example, a touchpad or a keyboard, as long as the operation of the portable terminal 2 is enabled. The user can input characters, numerals, or the like using the device. When the operation unit 25 is operated by the user, it generates a signal corresponding to the operation. In addition, the generated signal is input into the processing unit 27 as the instructions of the user.

The display unit 26 may be any device such as, for example, a liquid crystal display or an organic EL (Electro-Luminescence) display, as long as videos, images, and the like can be displayed. The display unit 26 displays videos corresponding to video data supplied from the processing unit 27, an image corresponding to image data, and the like.

The processing unit 27 includes one or plural processors and the peripheral circuits thereof. The processing unit 27, which synthetically controls the overall operation of the portable terminal 2, is, for example, a CPU (Central Processing Unit). In other words, the processing unit 27 controls the operations of the communication unit 21, the display unit 26, and the like so that the various processes of the portable terminal 2 are executed in a suitable procedure according to programs stored in the storage unit 22, the operation of the operation unit 25, and the like. The processing unit 27 executes a process based on the programs (the driver program, the operating system program, the application program, and the like) stored in the storage unit 22. In addition, the processing unit 27 can execute the plural programs (application programs and the like) in parallel.

The processing unit 27 includes a status detection unit 271, an operating system 272, and a connection control unit 273. Each of the units included in the processing unit 27 is a functional module implemented via a program executed on the processor included in the processing unit 27. Alternatively, each of the units included in the processing unit 27 may be implemented as s firmware on the portable terminal 2.

The status detection unit 271 regularly acquires data indicating the location of the user from the GPS unit 23, acquires data indicating the acceleration, inclination, vibration, direction, and the like of the user from the various sensors 24, and judges whether or not the user is in a movement status based on such data. Then, if the status of the user has changed, the status detection unit 271 notifies the connection control unit 273 of the status of the user. The details of the process will be explained later.

The operating system 272, which realizes basic functions utilized by applications in common and controls the overall portable terminal 2, is, for example, Android (registered trademark) OS, iOS (registered trademark), or the like. The operating system 272 relays notification of the status of the user, the status of connection to the access point 3, or the like between the status detection unit 271 and the connection control unit 273.

The connection control unit 273 executes the wireless communication system with the IEEE 802.11 specification. When the connection control unit 273 is notified of the status of the user from the status detection unit 271, the connection control unit 273 operates in either a normal mode or a connection restriction mode depending on the status and the latest operation mode. In the normal mode, the connection control unit 273 makes a connection to an access point 3 in the normal procedure specified by the wireless communication system with the IEEE 802.11 specification. On the other hand, the connection control unit 273 makes a connection to an access point 3 in a predetermined procedure in the connection restriction mode. The details of the process will be explained later.

The process by the status detection unit 271 will be explained below.

When it is detected that the display unit 26 has been turned on in a state where the function of connection to the wireless LAN is enabled, the status detection unit 271 initializes the status of the user stored in the storage unit 22 to "non-movement status."

The status detection unit 271 acquires data indicating the location of the user from the GPS unit 23, acquires data indicating the acceleration, inclination, vibration, direction, and the like of the user from the various sensors 24, and judges whether or not the user is in a movement status based on such data. A method described in Japanese Laid-open Patent Publication No. 2011-180023, Japanese Laid-open Patent Publication No. 2011-171908, Japanese Laid-open Patent Publication No. 2009-204429, or the like can be utilized for detection of the status of the user.

If it is judged that the user is in a movement status when the status of the user stored in the storage unit 22 is "non-movement status", the status detection unit 271 switches the status to "movement status". In addition, the status detection unit 271 notifies the connection control unit 273 of the status: "movement status".

On the other hand, if it is judged that the user is not in a movement status when the status of the user stored in the storage unit 22 is "movement status", the status detection unit 271 switches the status to "non-movement status". In addition, the status detection unit 271 notifies the connection control unit 273 of the status: "non-movement status".

The process by the connection control unit 273 will be explained below.

When the display unit 26 has been turned on in a state where the function of connection to the wireless LAN is enabled, the connection control unit 273 starts an operation in the normal mode.

In the normal mode, the connection control unit 273 makes a connection to the access point 3 in the normal procedure specified in the wireless communication system with the IEEE 802.11 specification.

When disconnection of the connection to the access point 3 is detected due to, e.g., movement to the outside of the service area of the access point 3, the connection control unit 273 executes the above-mentioned procedure again.

The connection control unit 273 shifts to the connection restriction mode when notified of the status of the user: "movement status" from the status detection unit 271.

In the connection restriction mode, the connection control unit 273 initializes the number of times of scans, stored in the storage unit 22, to "0".

The connection control unit 273 executes a scan via the communication unit 21 to detect neighboring accessible access points 3 and increments the number of times of scans, stored in the storage unit 22, by 1. In addition, the connection control unit 273 stores the BSSIDs of the detected access points 3 in the storage unit 22.

The connection control unit 273 waits a predetermined time.

After the predetermined time has passed, the connection control unit 273 executes a scan via the communication unit 21 again to detect neighboring accessible access points 3 and increments the number of times of scans, stored in the storage unit 22, by 1. If the number of times of scans is less than a predetermined number of times, the connection control unit 273 stores the BSSIDs of the detected access points 3 in the storage unit 22 and then executes the above-mentioned procedure again.

On the other hand, when the number of times of scans is not less than the predetermined number of times, the connection control unit 273 verifies the BSSIDs of the detected access points 3 with the BSSIDs of the access points 3 stored in the storage unit 22 to identify the access points (hereinafter referred to as "fixed access points") 3 having the same BSSIDs. When the fixed access points 3 are identified, the connection control unit 273 stores the BSSIDs of the identified fixed access points 3 in the storage unit 22. On the other hand, when no fixed access point 3 is identified, the connection control unit 273 executes the above-mentioned procedure again.

The connection control unit 273 attempts to connect to any one of the fixed access points 3 via the communication unit 21. Once the connection to any one of the fixed access points 3 is established, even if an access point 3 with a stronger signal is detected in subsequent scans, the connection control unit 273 does not attempt to connect to the access point 3 unless the BSSID of the access point 3 is included in the BSSIDs of the fixed access points 3 stored in the storage unit 22.

If disconnection of the connection to the fixed access point 3 is detected due to, e.g., movement to the outside of the service area of the fixed access point 3, the connection control unit 273 executes the above-mentioned procedure again.

The connection control unit 273 shifts to the normal mode when notified of the status of the user: "non-movement status" from the status detection unit 271.

Figure 4:
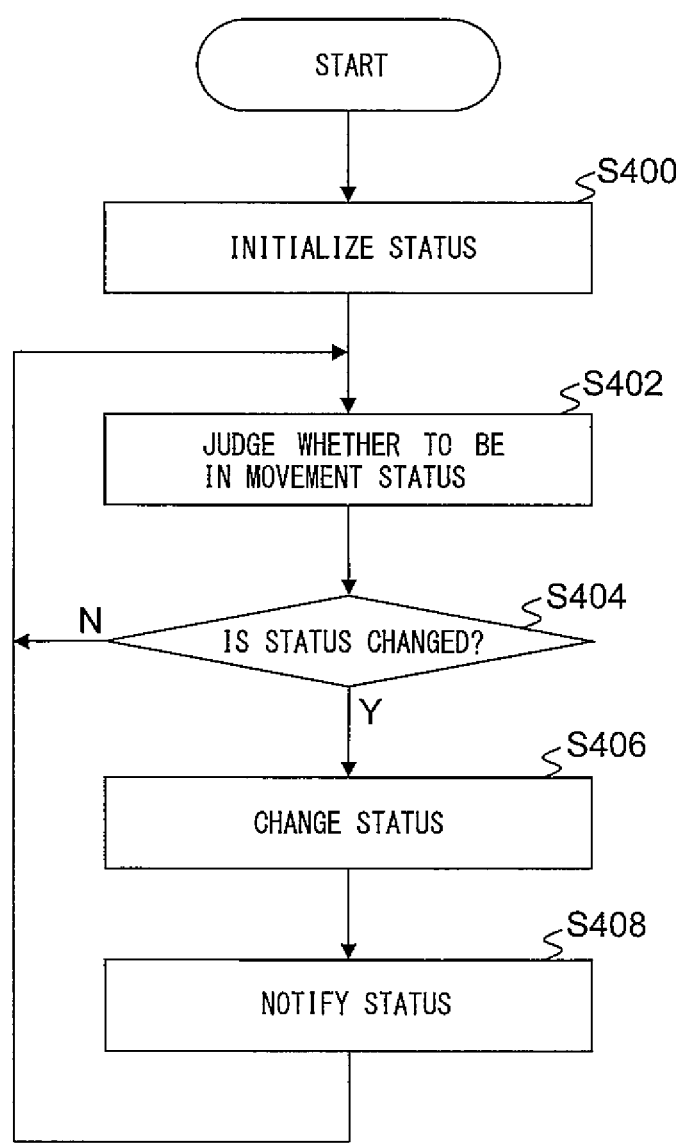
FIG. 4 is a view indicating an example of the operation flow of a status detection unit.

FIG. 4 is a view indicating an example of the operation flow of the status detection unit 271. The operation flow explained below is executed mainly by the processing unit 27 in cooperation with each element of the portable terminal 2 based on a program prestored in the storage unit 22.

When it is detected that the display unit 26 has been turned on in a state where the function of connection to the wireless LAN is enabled, the status detection unit 271 initializes the status of the user, stored in the storage unit 22, to "non-movement status" (step S400).

The status detection unit 271 judges whether or not the user is in a movement status (step S402).

When it is judged that the user is not in a movement status when the status of the user stored in the storage unit 22 is "non-movement status" (step S404—No), the status detection unit 271 returns to step S402.

On the other hand, when it is judged that the user is in a movement status (step S404—Yes), the status detection unit 271 switches the status of the user to "movement status" (step S406).

In addition, the status detection unit 271 notifies the connection control unit 273 of the status of the user: "movement status" (step S408).

On the other hand, when it is judged that the user is in a movement status when the status of the user stored in the storage unit 22 is "movement status" (step S404—No), the status detection unit 271 returns to step S402.

On the other hand, when it is judged that the user is not in a movement status (step S404—Yes), the status detection unit 271 switches the status of the user to "non-movement status" (step S406).

In addition, the status detection unit 271 notifies the connection control unit 273 of the status of the user: "non-movement status" (step S408).

Then, the status detection unit 271 returns to step S402.

Figure 5A:
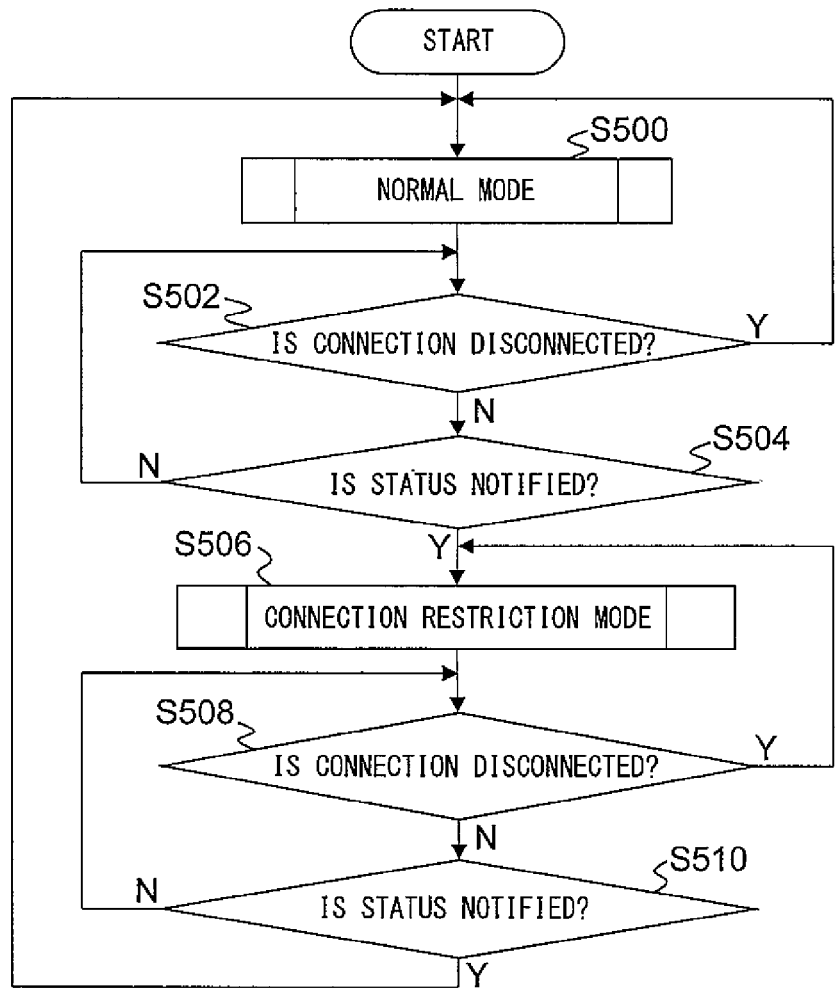
FIG. 5A is a view indicating an example of the operation flow of a connection control unit.
Figure 5B:
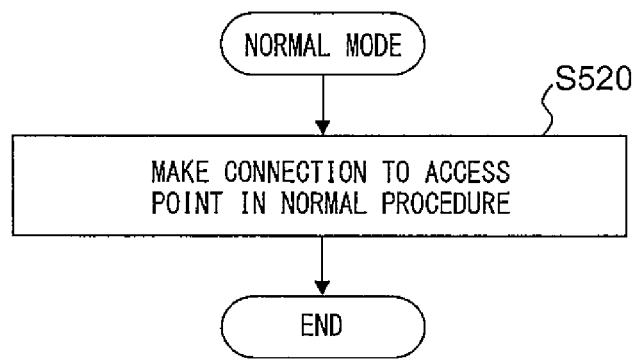
FIG. 5B is a view indicating an example of the operation flow of a connection control unit.
Figure 5C:
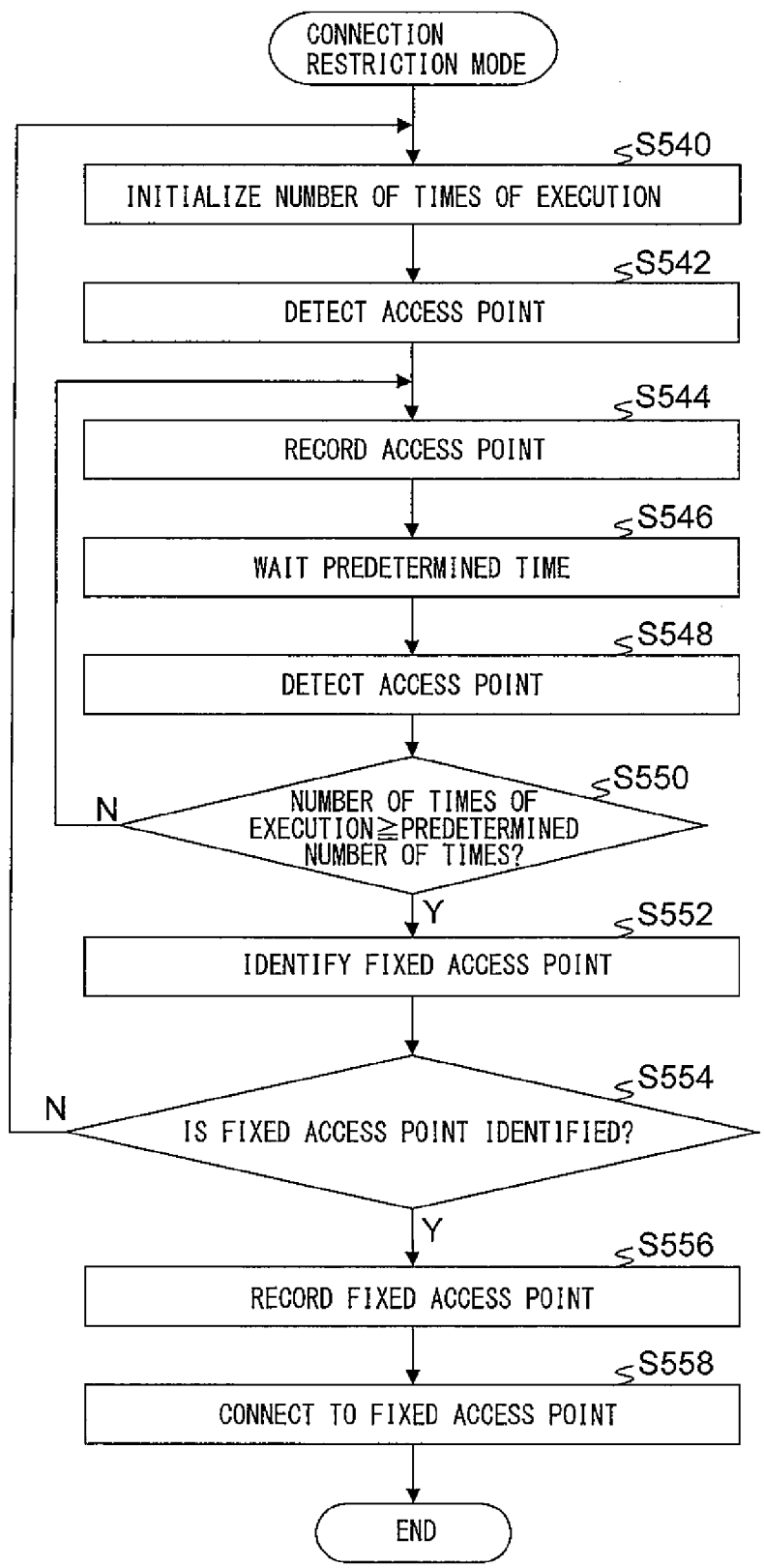
FIG. 5C is a view indicating an example of the operation flow of a connection control unit.

FIGS. 5A to 5C are views indicating an example of the operation flow of the connection control unit 273.

When it is detected that the display unit 26 has been turned on in a state where the function of connection to the wireless LAN is enabled, the connection control unit 273 starts an operation in the normal mode (step S500).

In the normal mode, the connection control unit 273 makes a connection to the access point 3 in the normal procedure specified in the wireless communication system with the IEEE 802.11 specification (step S520).

When disconnection of the connection to the access point 3 is detected (step S502—Yes), the connection control unit 273 returns to step S500.

The connection control unit 273 returns to step S502 when not notified of the status of the user or notified of "non-movement status" from the status detection unit 271 (step S504—No).

On the other hand, the connection control unit 273 shifts to a connection restriction mode (step S506) when notified of the status of the user: "movement status" (step S504—Yes).

In the connection restriction mode, the connection control unit 273 initializes the number of times of scans, stored in the storage unit 22, to "0" (step S540).

The connection control unit 273 executes a scan via the communication unit 21 to detect neighboring accessible access points 3 and increments the number of times of scans, stored in the storage unit 22, by 1 (step S542).

The connection control unit 273 stores the BSSIDs of the detected access points 3 in the storage unit 22 (step S544).

The connection control unit 273 waits a predetermined time (step S546).

After the predetermined time has passed, the connection control unit 273 executes a scan again via the communication unit 21 again to detect neighboring accessible access points 3 and increments the number of times of scans, stored in the storage unit 22, by 1 (step S548).

When the number of times of scans stored in the storage unit 22 is less than a predetermined number of times (step S550—No), the connection control unit 273 returns to step S544.

On the other hand, when the number of times of scans is not less than the predetermined number of times (step S550—Yes), the connection control unit 273 verifies the BSSIDs of the detected access points 3 with the BSSIDs of the access points 3 stored in the storage unit 22 to identify the fixed access points 3 (step S552).

If no fixed access point 3 is identified (step S554—No), the connection control unit 273 returns to step S540.

On the other hand, when the fixed access points 3 are identified (step S554—Yes), the connection control unit 273 stores the BSSIDs of the identified fixed access points 3 in the storage unit 22 (step S556).

The connection control unit 273 makes a connection to any one of the fixed access points 3 via the communication unit 21 (step S558).

When disconnection of the connection to the fixed access point 3 is detected (step S508—Yes), the connection control unit 273 returns to step S506.

The connection control unit 273 returns to step S508 when not notified of the status of the user or notified of "movement status" from the status detection unit 271 (step S510—No).

On the other hand, the connection control unit 273 shifts to a normal mode (step S500) when notified of the status of the user: "non-movement status" (step S510-Yes).

As explained above, smooth communication can be achieved by connecting, and maintaining the connection with, the identical access point that has been detected consecutively as a result of a predetermined number of times of scans with predetermined time intervals.

The present invention is not limited to the present embodiment. For example, in the present embodiment, when the function of connection to the wireless LAN has been enabled, the status detection unit 271 regularly judges whether or not the user is in a movement status. However, the operation of the status detection unit 271 may be stopped when the status detection unit 271 has been connected to the wireless LAN and when the function of connection to the wireless LAN has been disabled, while the operation of the status detection unit 271 may be restarted when the connection to the wireless LAN is disconnected and when the function of connection to the wireless LAN has been enabled. As a result, the consumption of a cell can be reduced.

Since the user is unable to confirm connection situations, contents, and the like by visual observation when the display unit 26 (e.g., liquid crystal display) is off, the status detection unit 271 may stops the operation thereof when the display unit 26 has been turned off and may restart the operation thereof when the display unit 26 has been turned on. As a result, the consumption of a cell can be further reduced.

The display unit 26 is turned off when the display unit 26 is manually turned off by the user, or when the display unit 26 is automatically turned off due to timeout, or the like. However, since the display unit 26 may be manually turned on by the user immediately after the display unit 26 has automatically been turned off, the status detection unit 271 may stop the operation thereof after a predetermined time (for example, 30 seconds) has passed since the display unit 26 was turned off. As a result, consumption of a cell can be reduced without deterioration of the convenience of the user.

The status detection unit 271 may stop and restart the operation thereof according to instructions from the user and/or the server. As a result, the consumption of a cell can be controlled.

In the present embodiment, the connection control unit 273 executes two scans at intervals of 2 minutes to detect the access point 3. However, other time intervals and/or numbers of times may be adopted. The time intervals and/or the number of times of scans can be changed with a configuration file or the like by the user and/or the system. As a result, various moving means, communication environments, and the like can be supported.

A computer program for allowing a computer to realize each function which the processing unit 27 has according to the present embodiment may also be provided in the form recorded in a computer-readable recording medium such as a magnetic recording medium or an optical recording medium.

Second Embodiment

Figure 6:
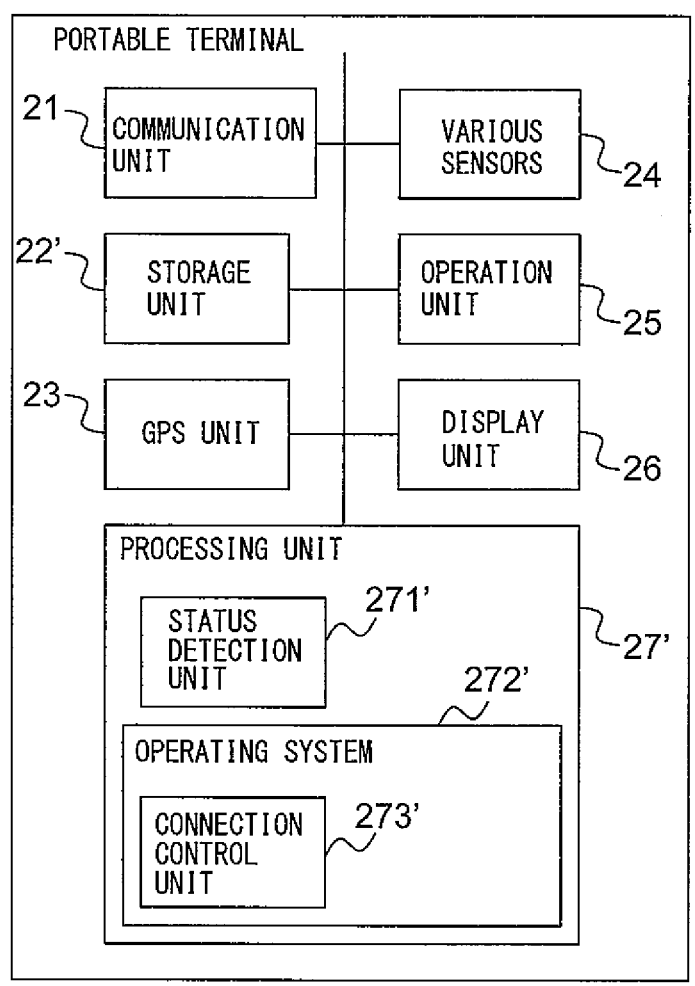
FIG. 6 is a view illustrating an example of the schematic configuration of a portable terminal according to a second embodiment.

In the first embodiment, the portable terminal 2 always operates the GPS unit 23 and the various sensors 24. In addition, when it is judged using the GPS unit 23 and the various sensors 24 that the user is in a movement status, the portable terminal 2 generally restricts connection to the access point 3. However, the portable terminal 2 may operate the GPS unit 23 and the various sensors 24 only when a predetermined condition is satisfied, or only predetermined access points 3 may be subject to connection restriction. FIG. 6 is a view illustrating an example of the schematic configuration of a portable terminal 2' in such a wireless LAN communication system 1'.

The portable terminal 2' includes a communication unit 21, a storage unit 22', a GPS unit 23, various sensors 24, an operation unit 25, a display unit 26, and a processing unit 27'. Of these configurations, the communication unit 21, the GPS unit 23, the various sensors 24, the operation unit 25, and the display unit 26 are the same as those illustrated in FIG. 3, and therefore, explanation thereof will be omitted below.

The storage unit 22' stores a driver program, an operating system program, an application program, data, and the like used in a process in the processing unit 27'. The storage unit 22' stores, for example, a connection control program that executes the wireless communication system with the IEEE 802.11 specification, and the like as operating system. In addition, the storage unit 22' stores a status detection program that judges whether or not a user is in a movement status, and the like as application programs. In addition, the storage unit 22' stores as data the distinction of ON/OFF of a condition detection function, a configuration file including the ESSID and the like of a network which is subject to connection restriction, the ESSID of a network targeted for connection, the distinction between the validity and invalidity thereof, and a connection configuration file including the priority thereof and the like, data indicating the operation mode of the processing unit 27', the number of times of scans, BSSIDs of access points 3 to which a connection has been made in the past, the BSSID of a detected access point 3, and the like.

The processing unit 27' includes a status detection unit 271', an operating system 272', and a connection control unit 273'.

When a predetermined status detection starting condition is satisfied, the status detection unit 271' activates the GPS unit 23 and the various sensors 24 and detects the status of the user (judges whether or not the user is in a movement status) based on data acquired from the GPS unit 23 and the various sensors 24. The status detection unit 271' also determines the operation mode based on the detected status of the user and the latest operation mode. Further, the status detection unit 271' notifies the connection control unit 273' of the determined operation mode. The details of the process will be explained later.

The operating system 272' relays notification of the operation mode and the like between the status detection unit 271' and the connection control unit 273'.

The connection control unit 273' executes the wireless communication system with the IEEE 802.11 specification. When the connection control unit 273' is notified of the operation mode from the status detection unit 271', the connection control unit 273' operates in the notified operation mode, i.e., either the normal mode or the connection restriction mode. In the normal mode, the connection control unit 273' makes a connection to an access point 3 in the normal procedure specified in the wireless communication system with the IEEE 802.11 specification. On the other hand, in the connection restriction mode, the connection control unit 273' makes a connection to the access point 3 in a predetermined procedure. The details of the process will be explained later.

The process by the status detection unit 271' will be explained below.

When it is detected that the function of connection to the wireless LAN has been enabled, the status detection unit 271' initializes the operation mode, stored in the storage unit 22', to "normal mode".

When a predetermined status detection starting condition is satisfied, the status detection unit 271' starts the GPS unit 23 and the various sensors 24. The status detection unit 271' acquires data indicating the location of the user from the GPS unit 23, acquires data indicating the acceleration, inclination, vibration, direction, and the like of the user from the various sensors 24, and detects the status of the user based on the acquired data (hereinafter referred to as "initial status detection"). For the predetermined status detection starting condition, all of these conditions shall be satisfied: (1) a condition detection function is on; (2) at least one of the ESSIDs of networks targeted for connection restriction is included in the ESSIDs of networks targeted for connection; (3) the function of connection to the wireless LAN is enabled; (4) unconnected or connecting to the wireless LAN, connected to the wireless LAN and the ESSID of the connected access point 3 is included in the ESSIDs of the networks targeted for connection restriction, or connected to the wireless LAN, the ESSID of the connected access point 3 is not included in the ESSIDs of the networks targeted for connection restriction, and the latest operation mode is "connection restriction mode"; (5) the display unit 26 is on; and (6) a screen lock has been released. However, another status detection starting condition can also be used.

On the other hand, if the predetermined status detection starting condition is not satisfied, the status detection unit 271' repeats the judgment process of the predetermined status detection starting condition.

If a predetermined status detection forced termination condition is satisfied during the detection of the status of the user, the status detection unit 271' immediately terminates the process and returns to an operation mode initialization process. For the predetermined status detection forced termination condition, at least one of these conditions shall be satisfied: (1) the condition detection function has been changed to off; (2) none of the ESSIDs of the networks targeted for connection restriction is included in the ESSIDs of the networks targeted for connection due to update of a configuration file and/or a connection configuration file; (3) the function of connection to the wireless LAN has been disabled; and (4) connected to an access point 3 having an ESSID other than the ESSIDs of the networks targeted for connection restriction and the latest operation mode is "normal mode". However, another status detection forced termination condition can also be used.

On the other hand, when the predetermined status detection forced termination condition is not satisfied, the status detection unit 271' refers to the storage unit 22' to identify the latest operation mode, determines an operation mode based on the identified latest operation mode and the detected status of the user, and updates the operation mode stored in the storage unit 22' in the determined operation mode. The status detection unit 271' determines as "normal mode" if the latest operation mode is "normal mode" and the status of the user is "non-movement status", determines as "connection control mode" if the latest operation mode is "normal mode" and the status of the user is "movement status", determines as "connection control mode" if the latest operation mode is "connection control mode" and the status of the user is "movement status", and determines as "normal mode" if the latest operation mode is "connection control mode" and the status of the user is "non-movement status". In addition, the status detection unit 271' notifies the connection control unit 273' of the determined operation mode.

When a predetermined status detection continuation condition is satisfied, the status detection unit 271' acquires data indicating the location of the user from the GPS unit 23, acquires data indicating the acceleration, inclination, vibration, direction, and the like of the user from the various sensors 24, and detects the status of the user based on these data (hereinafter referred to as "continuation status detection"). For the predetermined status detection continuation condition, all of these conditions are satisfied: (1) the display unit 26 is on; and (2) a screen lock has been released. However, another status detection continuation condition can also be used.

On the other hand, if the predetermined status detection continuation condition is not satisfied, the status detection unit 271' stops the GPS unit 23 and the various sensors 24. Then, the status detection unit 271' returns to the process of judging the predetermined status detection starting condition.

When the predetermined status detection termination condition is satisfied, the status detection unit 271' stops the GPS unit 23 and the various sensors 24. Then, the status detection unit 271' returns to the process of judging the predetermined status detection starting condition. The predetermined status detection termination condition is in a condition in which the display unit 26 has been changed to off. However, another status detection termination condition can also be used.

On the other hand, if the predetermined status detection termination condition is not satisfied, the status detection unit 271' returns to the process of detecting the status of the user.

The process by the connection control unit 273' will be explained below.

When it is detected that the function of connection to the wireless LAN has been enabled, the connection control unit 273' starts an operation in the normal mode.

In the normal mode, the connection control unit 273' refers to a connection configuration file stored in the storage unit 22' and initializes all of the ESSIDs of the networks targeted for connection to "valid". In addition, the connection control unit 273' deletes the BSSIDs of the access points 3 which are stored similarly in the storage unit 22' and which have been connected in the past. Then, the connection control unit 273' starts a connection process.

The connection control unit 273' makes a connection to an access point 3 in the normal procedure specified in the wireless communication system with the IEEE 802.11 specification. Then, the connection control unit 273' terminates the process.

When disconnection of the connection to the access point 3 is detected due to, e.g., movement to the outside of the service area of the access point 3, the connection control unit 273' returns to the connection process in the normal mode.

The connection control unit 273' shifts to the connection restriction mode when notified of the operation mode "connection restriction mode" from the status detection unit 271'.

On the other hand, the connection control unit 273' returns to the process of judging the presence or absence of disconnection when not notified of the operation mode from the status detection unit 271' or the notified operation mode is other than "connection restriction mode".

In the connection restriction mode, the connection control unit 273' refers to the configuration file stored in the storage unit 22' and identifies the ESSIDs of networks targeted for connection restriction. In addition, the connection control unit 273' refers to the connection configuration file stored similarly in the storage unit 22' and switches to "invalid" all ESSIDs included in those of the networks targeted for connection restriction among the ESSIDs of the networks targeted for connection. Then, the connection control unit 273' starts the connection process.

The connection control unit 273' initializes the number of times of scans, stored in the storage unit 22', to "0". In addition, the connection control unit 273' deletes the BSSIDs of the detected access points 3 stored similarly in the storage unit 22'.

The connection control unit 273' executes a scan via the communication unit 21 to detect neighboring accessible access points 3 and increments the number of times of scans, stored in the storage unit 22', by 1. Then, the connection control unit 273' judges whether or not an access point 3 targeted for connection is present. For the detected access point 3, if any one of these conditions is satisfied, the connection control unit 273' judges that the access point 3 is targeted for connection: (1) the ESSID of the access point 3 is "valid", (2) the BSSID of the access point 3 is included in the BSSIDs of the access points 3 to which a connection has been made in the past; and (3) the number of times of scans is not less than a predetermined number of times and the BSSID of the access point 3 is included in the BSSIDs of the detected access points 3.

When the access point 3 targeted for connection is present, the connection control unit 273' makes a connection to the access point 3 via the communication unit 21. In addition, the connection control unit 273' stores the BSSID of the connected access point 3 as one which has been connected in the past in the storage unit 22'. Then, the connection control unit 273' terminates the process. When a plurality of access points 3 targeted for connection are present, the connection control unit 273' attempts to connect in descending order of the priorities of the ESSIDs of the access points 3 and the RSSI (Received Signal Strength Indication) values of the access points 3. However, an access point 3 can also be selected using another criterion and/or another method.

On the other hand, when no access point 3 targeted for connection is present, the connection control unit 273' judges whether or not the number of times of scans stored in the storage unit 22' is not less than a predetermined number of times. When the number of the executed scans is not less than the predetermined number of times, the connection control unit 273' terminates the process.

On the other hand, when the number of times of scans is less than the predetermined number of times, the connection control unit 273' records the BSSID of the detected access point 3 in the storage unit 22'. When the number of times of scans is one or less, the connection control unit 273' stores the BSSID of the access point 3 as a detected point in the storage unit 22'. On the other hand, when the number of the executed scans is two or more, the connection control unit 273' deletes the BSSIDs other than those of the access point 3 from the BSSIDs of the detected access points 3 stored in the storage unit 22'.

The connection control unit 273' waits a predetermined time and then returns to the process of detecting an access point 3.

When disconnection of a connection to the access point 3 is detected due to, e.g., movement to the outside of the service area of the access point 3, the connection control unit 273' returns to the connection process in the connection restriction mode.

When a predetermined connection restriction mode termination condition is satisfied, the connection control unit 273' shifts to the normal mode. For the predetermined connection restriction mode termination condition, at least one of these conditions are satisfied: (1) a condition detection function has been changed to off; and (2) the function of connection to the wireless LAN has been disabled. However, another connection restriction mode termination condition can also be used.

The connection control unit 273' also shifts to the normal mode when notified of the operation mode: "normal mode" from the status detection unit 271'.

On the other hand, the connection control unit 273' returns to the process of judging the presence or absence of disconnection when not notified of the operation mode from the status detection unit 271' or the notified operation mode is other than "normal mode".

Figure 7:
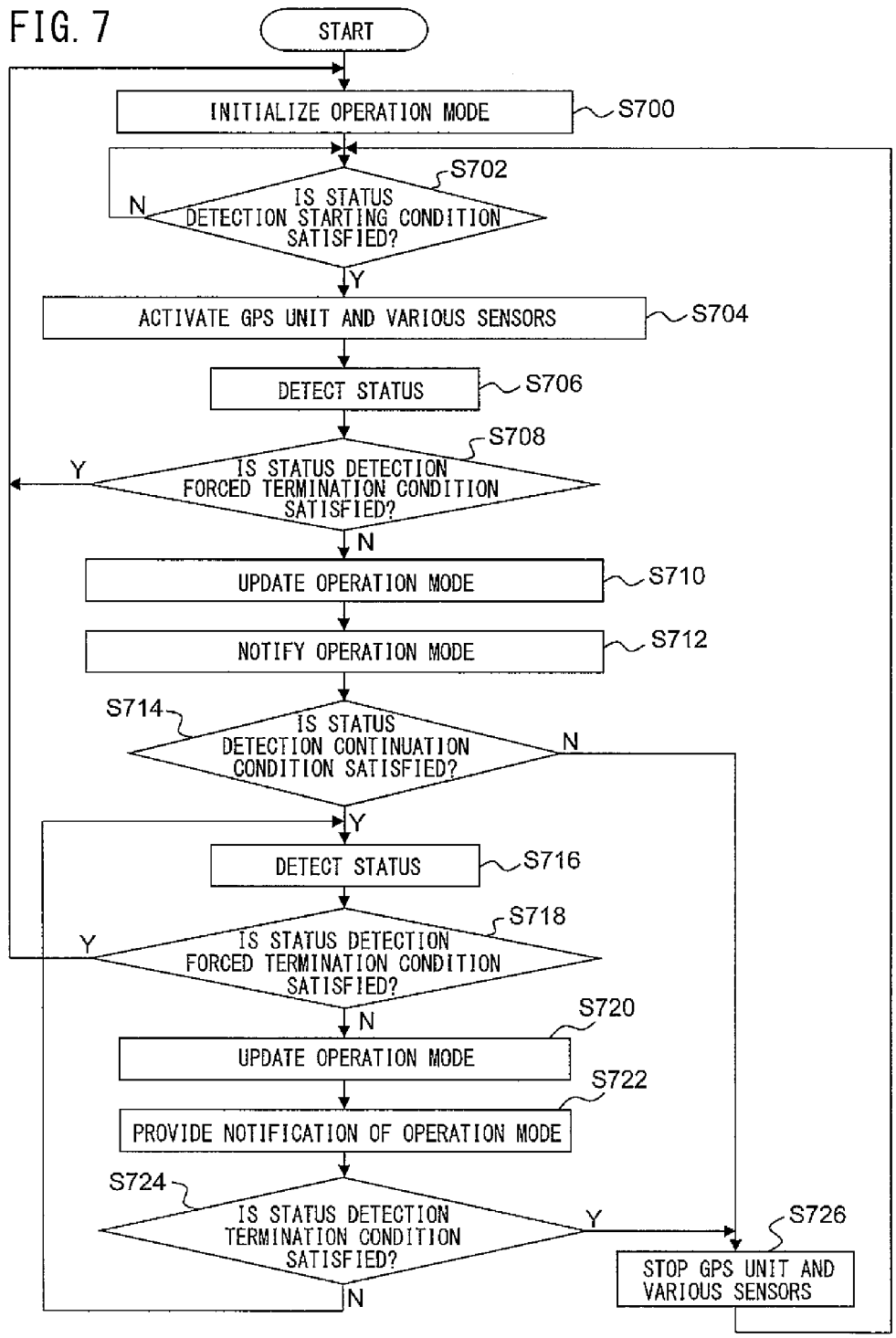
FIG. 7 is a view indicating an example of the operation flow of a status detection unit.

FIG. 7 is a view indicating an example of the operation flow of the condition detection unit 271'. The operation flow explained below is executed mainly by the processing unit 27' in cooperation with each element of the portable terminal 2' based on a program prestored in the storage unit 22'.

When it is detected that the function of connection to the wireless LAN has been enabled, the status detection unit 271' initializes the operation mode, stored in the storage unit 22', to "normal mode" (step S700).

When a predetermined status detection starting condition is satisfied (step S702—Yes), the status detection unit 271' activates the GPS unit 23 and the various sensors 24 (step S704).

On the other hand, when the predetermined status detection starting condition is not satisfied (step S702—No), the status detection unit 271' repeats the process of judging the predetermined status detection starting condition.

The status detection unit 271' acquires data indicating the location of the user from the GPS unit 23, acquires data indicating the acceleration, inclination, vibration, direction, and the like of the user from the various sensors 24, and detects the status of the user based on the acquired data (step S706).

If a predetermined status detection forced termination condition is satisfied during the detection of the status of the user (step S708—Yes), the status detection unit 271' immediately terminates the process and returns to an operation mode initialization process.

On the other hand, when the predetermined status detection forced termination condition is not satisfied (step S708—No), the status detection unit 271' refers to the storage unit 22' to identify the latest operation mode, determines an operation mode based on the identified latest operation mode and the detected status of the user, and updates the operation mode stored in the storage unit 22' in the determined operation mode (step S710).

The status detection unit 271' notifies the connection control unit 273' of the determined operation mode (step S712).

When a predetermined status detection continuation condition is satisfied (step S714—Yes), the status detection unit 271' acquires data indicating the location of the user from the GPS unit 23, acquires data indicating the acceleration, inclination, vibration, direction, and the like of the user from the various sensors 24, and detects the status of the user based on the data (step S716).

If the predetermined status detection forced termination condition is satisfied during the detection of the status of the user (step S718—Yes), the status detection unit 271' immediately terminates the process and returns to the operation mode initialization process.

On the other hand, when the predetermined status detection forced termination condition is not satisfied (step S718—No), the status detection unit 271' refers to the storage unit 22' to identify the latest operation mode, determines an operation mode based on the identified latest operation mode and the detected status of the user, and updates the operation mode stored in the storage unit 22' in the determined operation mode (step S720).

The status detection unit 271' notifies the connection control unit 273' of the determined operation mode (step S722).

When the predetermined status detection continuation condition is not satisfied (step S714—No) or when the predetermined status detection termination condition is satisfied (step S724—Yes), the status detection unit 271' stops the GPS unit 23 and the various sensors 24 (step S726). Then, the status detection unit 271' returns to the process of judging the predetermined status detection starting condition.

On the other hand, when the predetermined status detection termination condition is not satisfied (step S724—No), the status detection unit 271' returns to the process of detecting the status of the user.

Figure 8:
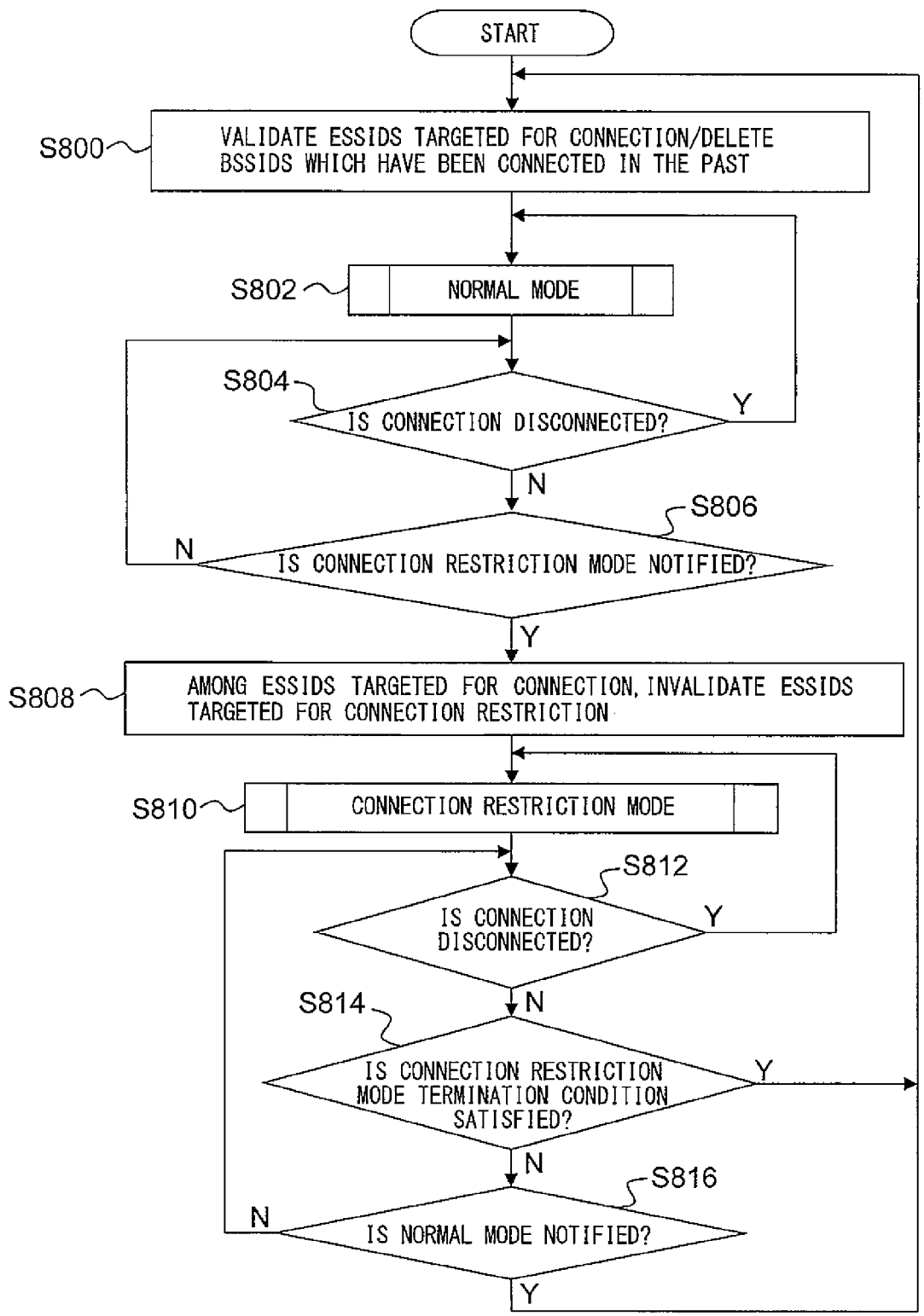
FIG. 8 is a view indicating an example of the operation flow of a connection control unit.
Figure 9A:
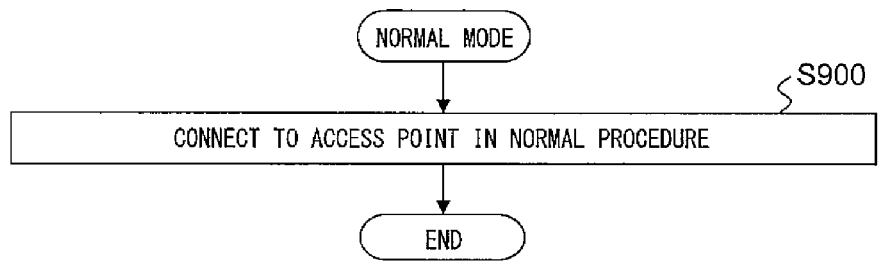
FIG. 9A is a view indicating an example of the operation flow of a connection control unit.
Figure 9B:
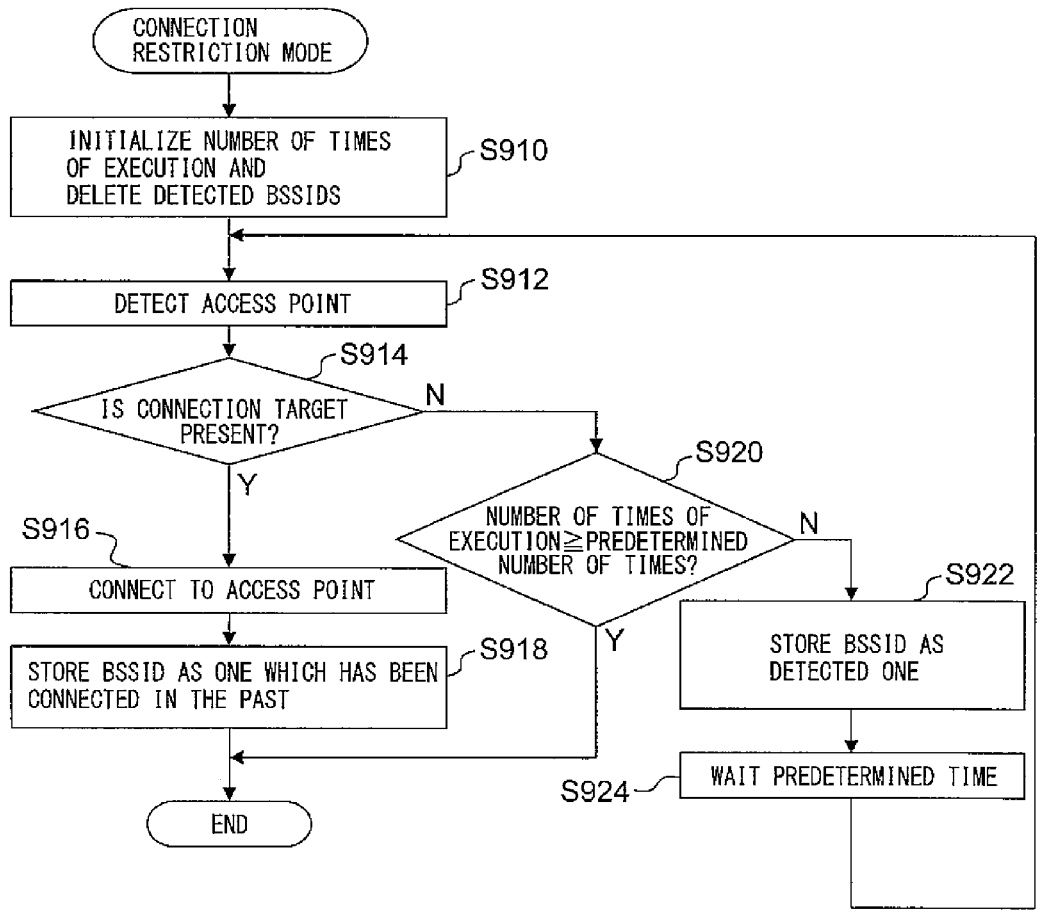
FIG. 9B is a view indicating an example of the operation flow of a connection control unit.

FIGS. 8, 9A, and 9B are views indicating an example of the operation flow of the connection control unit 273'.

When it is detected that the function of connection to the wireless LAN has been enabled, the connection control unit 273' starts an operation in a normal mode.

In the normal mode, the connection control unit 273' refers to a connection configuration file stored in the storage unit 22' and initializes all of the ESSIDs of networks targeted for connection to "valid". In addition, the connection control unit 273' deletes the BSSIDs of the access points 3 that are stored similarly in the storage unit 22' and have been connected in the past (step S800). Then, the connection control unit 273' starts a connection process (FIG. 9A) (step S802).

The connection control unit 273' makes a connection to an access point 3 in the normal procedure specified in the wireless communication system with the IEEE 802.11 specification (step S900). Then, the connection control unit 273' terminates the process.

Returning to FIG. 8, when disconnection of the connection to the access point 3 is detected (step S804—Yes), the connection control unit 273' returns to the connection process in the normal mode.

The connection control unit 273' shifts to the connection restriction mode when notified of the operation mode "connection restriction mode" from the status detection unit 271' (step S806—Yes).

On the other hand, the connection control unit 273' returns to the process of judging the presence or absence of disconnection when not notified of the operation mode from the status detection unit 271' or the notified operation mode is other than "connection restriction mode" (step S806—No).

In the connection restriction mode, the connection control unit 273' refers to the configuration file stored in the storage unit 22' and identifies the ESSIDs of networks targeted for connection restriction. In addition, the connection control unit 273' refers to the connection configuration file stored similarly in the storage unit 22' and switches to "invalid" all ESSIDs included in those of the networks targeted for connection restriction among the ESSIDs of the networks targeted for connection (step S808). Then, the connection control unit 273' starts the connection process (FIG. 9B) (step S810).

The connection control unit 273' initializes the number of times of scans, stored in the storage unit 22', to "0". In addition, the connection control unit 273' deletes the BSSIDs of the detected access points 3 stored similarly in the storage unit 22' (step S910).

The connection control unit 273' executes a scan via the communication unit 21 to detect neighboring accessible access points 3 and increments the number of times of scans, stored in the storage unit 22', by 1 (step S912).

The connection control unit 273' judges whether or not an access point 3 targeted for connection is present (step S914).

When the access point 3 targeted for connection is present (step S914—Yes), the connection control unit 273' makes a connection to the access point 3 via the communication unit 21 (step S916).

In addition, the connection control unit 273' stores the BSSID of the connected access point 3 as a point that has been connected in the past in the storage unit 22' (step S918). Then, the connection control unit 273' terminates the process.

On the other hand, when no access point 3 targeted for connection is present (step S914—No), the connection control unit 273' judges whether or not the number of times of scans stored in the storage unit 22' is equal to or more than a predetermined number of times (step S920).

When the number of times of scans is not less than the predetermined number of times (step S920—Yes), the connection control unit 273' terminates the process.

On the other hand, when the number of the executed scans is less than the predetermined number of times (step S920—No), the connection control unit 273' records the BSSID of the detected access point 3 in the storage unit 22' (step S922).

The connection control unit 273' waits a predetermined time (step S924) and then returns to the process of detecting an access point 3.

Returning to FIG. 8, when disconnection of a connection to the access point 3 is detected (step S812-Yes), the connection control unit 273' returns to the connection process in the connection restriction mode.

When a predetermined connection restriction mode termination condition is satisfied (step S814—Yes), the connection control unit 273' shifts to the normal mode.

The connection control unit 273' also shifts to the normal mode when notified of the operation mode: "normal mode" from the status detection unit 271' (step S816—Yes).

On the other hand, the connection control unit 273' returns to the process of judging the presence or absence of disconnection when not notified of the operation mode from the status detection unit 271' or the notified operation mode is other than "normal mode" (step S816—No).

As explained above, the GPS unit 23 and the various sensors 24 are started when the predetermined status detection starting condition is satisfied, and the GPS unit 23 and the various sensors 24 are stopped when the predetermined status detection termination condition is satisfied, whereby power consumption is reduced. Average waiting time needed for connection to an access point 3 is shortened by targeting for connection restriction only the access points 3 belonging to the networks targeted for connection restriction. As a result, deterioration of the convenience of the user due to realization of smooth communication using a wireless LAN can be inhibited.

The present invention is not limited to the present embodiment. In the present embodiment, for example, the status detection unit 271' carries out the initial status detection and the continuation status detection with equivalent precisions. However, the status detection unit 271' may carry out the initial status detection and the continuation status detection with different precisions. For example, the status detection unit 271' may carry out the continuation status detection with a lower precision than the initial status detection does. As a result, power consumption can be further reduced.

In the present embodiment, the status detection unit 271' detects the status of the user, determines an operation mode, and then immediately notifies the connection control unit 273' of the determined operation mode. However, the notification may be postponed for a predetermined time. For example, when the latest operation mode is "connection control mode" and the determined operation mode is "normal mode", the status detection unit 271' may postpone the notification for a predetermined time (for example, 120 seconds). As a result, the connection control unit 273' can be prevented from being notified of "normal mode" due to detection of a status during an accidental stoppage even though moving by a predetermined vehicle.

In the present embodiment, the connection control unit 273' immediately switches an ESSID included in those targeted for connection restriction, among the ESSIDs of the networks targeted for connection, to "invalid" when it has been notified of the operation mode: "connection restriction mode" from the status detection unit 271'. However, the switching of the ESSID of the connected access point 3 may be postponed until the connection with the access point 3 is disconnected. As a result, forced disconnection of the connection with the access point 3 can be prevented.

When the connection control unit 273' is requested from a predetermined application to make a connection to an access point 3 belonging to the networks targeted for connection restriction, the connection control unit 273' may make a connection to the access point 3 regardless of whether it is operating in the connection restriction mode. As a result, the predetermined application can be functionalized.

The contents of the configuration file and connection configuration file stored in the storage unit 22', and the upper limit of the storage capacity of access points 3 can be changed by a user and/or a system. As a result, various communication environments and the like can be supported.

Third Embodiment

Figure 10:
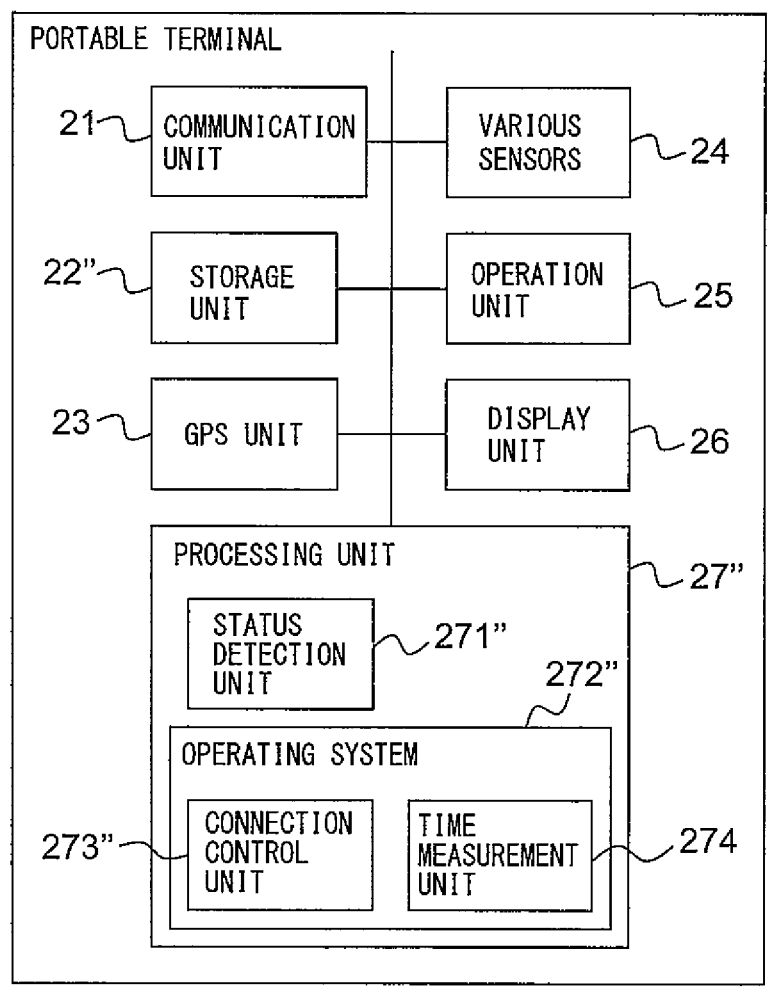
FIG. 10 is a view indicating an example of the operation flow of a connection control unit according to a third embodiment.

In the second embodiment, the status detection unit 271' determines an operation mode based on the latest operation mode and the status of the user and notifies the connection control unit 273' of the determined operation mode. On the other hand, the connection control unit 273' operates in the notified operation mode. The cooperative operation of the status detection unit 271' and the connection control unit 273' enables the connecting to the wireless LAN. However, unexpected operations such as the forced termination of a process which is not running may occur depending on an operating system. Thus, the discordance of the operation modes may occur between the status detection unit 271' and the connection control unit 273', and the overall processing unit 27' may be prevented from properly operating. For example, the connection control unit 273' may continue to operate in a connection restriction mode due to the discordance of the operation modes, so that connection with an access point 3 targeted for connection restriction cannot be changed. Thus, in the present embodiment, a time limit is set for an operation in a connection restriction mode. FIG. 10 is a view illustrating an example of the schematic configuration of a portable terminal 2" in such a wireless LAN communication system 1".

The portable terminal 2" includes a communication unit 21, a storage unit 22", a GPS unit 23, various sensors 24, an operation unit 25, a display unit 26, and a processing unit 27". Of the configurations, the communication unit 21, the GPS unit 23, the various sensors 24, the operation unit 25, and the display unit 26 are the same as those illustrated in FIG. 6, and therefore, explanation thereof will be omitted below.

The storage unit 22" stores those stored in the storage unit 22' illustrated in FIG. 6 as well as further stores a time measurement program for measuring time and the like as operating system programs. The stored configuration file further includes a time limit according to a status detection unit 271", a time limit according to a connection control unit 273", and the like.

The processing unit 27" includes the status detection unit 271", an operating system 272", the connection control unit 273", and a time measurement unit 274.

The status detection unit 271" instructs the time measurement unit 274 to start measurement of time when the latest operation mode is "connection restriction mode" if, for example, a predetermined status detection termination condition is satisfied. The status detection unit 271" detects the status of the user to determine an operation mode, and notifies the connection control unit 273" of the determined operation mode when notified by the time measurement unit 274 that a predetermined time has passed even if the predetermined status detection starting condition is not satisfied. The details of the process will be explained later.

The operating system 272" relays notifications of an operation mode, a lapse of a predetermined time, and the like between the status detection unit 271", the connection control unit 273", and the time measurement unit 274.

The connection control unit 273" instructs the time measurement unit 274 to start measurement of time when notified of the operation mode: "connection restriction mode" from the status detection unit 271". The connection control unit 273" shifts to a normal mode unless renotified of the operation mode: "connection restriction mode" from the status detection unit 271" before notified by the time measurement unit 274 that a predetermined time has passed. The details of the process will be explained later.

The time measurement unit 274 measures time. The time measurement unit 274 resets a time keeper to start measurement of time when instructed to start the measurement of time with a predetermined time as a parameter and terminates the measurement of time when instructed to terminate the measurement of time. The time measurement unit 274 resets the time keeper to start measurement of time when instructed to reset the time keeper. Further, when a given predetermined time has passed, the time measurement unit 274 terminates the measurement of time and notifies the status detection unit 271" or the connection control unit 273" that the predetermined time has passed.

The process by the status detection unit 271" will be explained below.

When it is detected that the function of connection to the wireless LAN has been enabled, the status detection unit 271" initializes the operation mode, stored in a storage unit 22", to "normal mode".

When a predetermined status detection starting condition is satisfied, the status detection unit 271" starts the GPS unit 23 and the various sensors 24. The status detection unit 271" acquires data indicating the location of the user from the GPS unit 23, acquires data indicating the acceleration, inclination, vibration, direction, and the like of the user from the various sensors 24, and detects the status of the user based on the acquired data.

On the other hand, when the predetermined status detection starting condition is not satisfied, the status detection unit 271" refers to the storage unit 22", identifies the latest operation mode, and judges whether or not the identified latest operation mode is "connection restriction mode".

When the latest operation mode is "connection restriction mode", the status detection unit 271" judges whether or not it has been notified by the time measurement unit 274 that a predetermined time has passed.

The status detection unit 271" starts the GPS unit 23 and the various sensors 24 when notified by the time measurement unit 274 that the predetermined time has passed. The status detection unit 271' acquires data indicating the location of the user from the GPS unit 23, acquires data indicating the acceleration, inclination, vibration, direction, and the like of the user from the various sensors 24, and detects the status of the user based on the acquired data.

On the other hand, the status detection unit 271" judges whether or not the predetermined time measurement termination condition is satisfied unless notified by the time measurement unit 274 that the predetermined time has passed. For the predetermined time measurement termination condition, at least one of these conditions shall be satisfied: (1) the condition detection function has been changed to off; (2) none of the ESSIDs of the networks targeted for connection restriction is included in the ESSIDs of the networks targeted for connection due to updating of a configuration file and/or a connection configuration file; and (3) the function of connection to the wireless LAN has been disabled. However, another time measurement termination condition can also be used.

When the predetermined time measurement termination condition is satisfied, the status detection unit 271" instructs the time measurement unit 274 to terminate the measurement of time. In addition, the status detection unit 271" returns to the process of initializing the operation mode.

On the other hand, when the predetermined time measurement termination condition is not satisfied, the status detection unit 271" returns to the process of judging the predetermined status detection starting condition.

The status detection unit 271" also returns to the process of judging the predetermined status detection starting condition when the latest operation mode is not "connection restriction mode".

When the predetermined status detection continuation condition is not satisfied or when the predetermined status detection termination condition is satisfied, the status detection unit 271" stops the GPS unit 23 and the various sensors 24. When the latest operation mode is identified with reference to the storage unit 22" and the identified latest operation mode is "connection restriction mode", the status detection unit 271" refers to the configuration file stored in the storage unit 22" to acquire a time limit according to the status detection unit 271", and instructs the time measurement unit 274 to start measurement of time with the acquired time limit as a parameter. Then, the status detection unit 271" returns to the process of judging the predetermined status detection starting condition.

The process by the connection control unit 273" will be explained below.

When it is detected that the function of connection to the wireless LAN has been enabled, the connection control unit 273" starts an operation in a normal mode.

In the normal mode, the connection control unit 273" initializes the ESSIDs of networks targeted for connection in the connection configuration file stored in the storage unit 22" and the BSSIDs of connected access points 3 similarly stored in the storage unit 22". Then, the connection control unit 273" starts a connection process.

The connection control unit 273" shifts to a connection restriction mode when notified of an operation mode: "connection restriction mode" from the status detection unit 271".

In the connection restriction mode, the connection control unit 273" refers to the configuration file stored in the storage unit 22" to acquire a time limit according to the connection control unit 273", and instructs the time measurement unit 274 to start measurement of time with the acquired time limit as a parameter. In addition, the connection control unit 273" initializes the ESSIDs of networks targeted for connection in the connection configuration file similarly stored in the storage unit 22'. Then, the connection control unit 273" starts a connection process.

The connection control unit 273" shifts to the normal mode when notified by the time measurement unit 274 that a predetermined time.

When the connection control unit 273" is notified of an operation mode from the status detection unit 271", the connection control unit 273" judges whether or not the notified operation mode is "normal mode". The connection control unit 273" also shifts to the normal mode when the notified operation mode is "normal mode".

On the other hand, when the notified operation mode is not "normal mode", the connection control unit 273" instructs the time measurement unit 274 to reset the time keeper. Then, the connection control unit 273" returns to the process of judging the presence or absence of disconnection of the connection.

The connection control unit 273" also returns to the process of judging the presence or absence of disconnection of the connection unless notified of an operation mode by the status detection unit 271".

Figure 11:
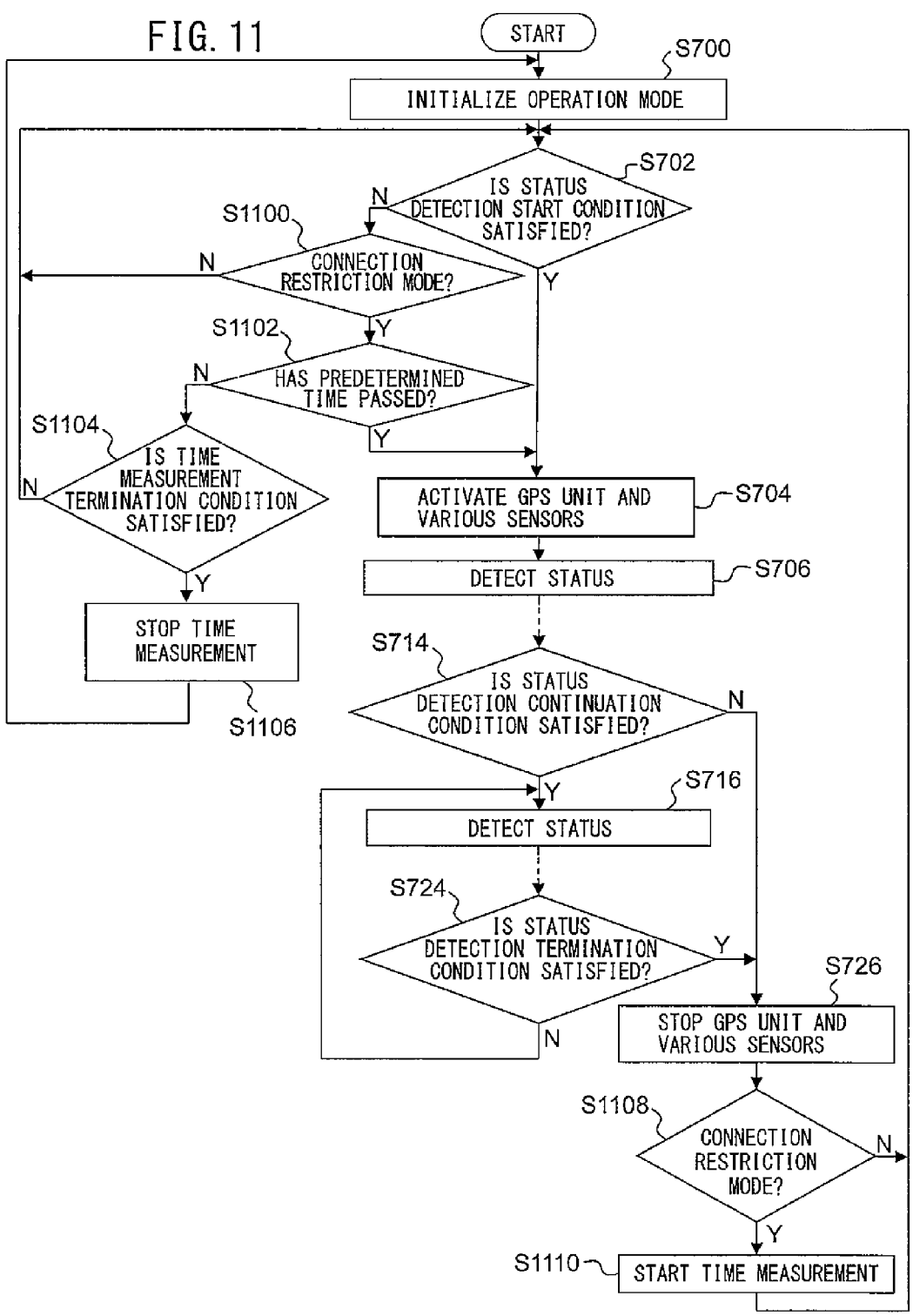
FIG. 11 is a view indicating an example of the operation flow of a status detection unit.

FIG. 11 is a view indicating an example of the operation flow of the status detection unit 271". The operation flow explained below is executed mainly by the processing unit 27" in cooperation with each element of the portable terminal 2" based on a program prestored in the storage unit 22". Since steps S700, 706 to 712, and 716 to 722 in the operation flow are the same as those indicated in FIG. 7, the explanation thereof will be omitted below.

When the predetermined status detection starting condition is not satisfied (step S702—No), the status detection unit 271" refers to the storage unit 22", identifies the latest operation mode, and judges whether or not the identified latest operation mode is "connection restriction mode" (step S1100).

When the latest operation mode is "connection restriction mode" (step S1100—Yes), the status detection unit 271" judges whether or not it has been notified by the time measurement unit 274 that a predetermined time has passed (step S1102).

The status detection unit 271" starts the GPS unit 23 and the various sensors 24 (step S704) when notified of the lapse of the predetermined time from the time measurement unit 274 (step S1102—Yes).

On the other hand, the status detection unit 271" judges whether or not the predetermined time measurement termination condition is satisfied (step S1104) unless notified by the time measurement unit 274 that the predetermined time has passed (step S1102—No).

When the predetermined time measurement termination condition is satisfied (step S1104—Yes), the status detection unit 271" instructs the time measurement unit 274 to stop the measurement of time (step S1106). Then, the status detection unit 271" returns to the process of initializing an operation mode.

On the other hand, when the predetermined time measurement termination condition is not satisfied (step S1104—No), the status detection unit 271" returns to the process of judging the predetermined status detection starting condition.

The status detection unit 271" also returns to the process of judging the predetermined status detection starting condition when the latest operation mode is not "connection restriction mode" (step S1100—No).

When the predetermined status detection continuation condition is not satisfied (step S714—No) or when the predetermined status detection termination condition is satisfied (step S724—Yes), the status detection unit 271" stops the GPS unit 23 and the various sensors 24 (step S726).

When the latest operation mode is identified with reference to the storage unit 22" and the identified latest operation mode is "connection restriction mode" (step S1108—Yes), the status detection unit 271" refers to the configuration file stored in the storage unit 22" to acquire a time limit according to the status detection unit 271", and instructs the time measurement unit 274 to start measurement of time with the acquired time limit as a parameter (step S1110). Then, the status detection unit 271" returns to the process of judging the predetermined status detection starting condition.

Figure 12:
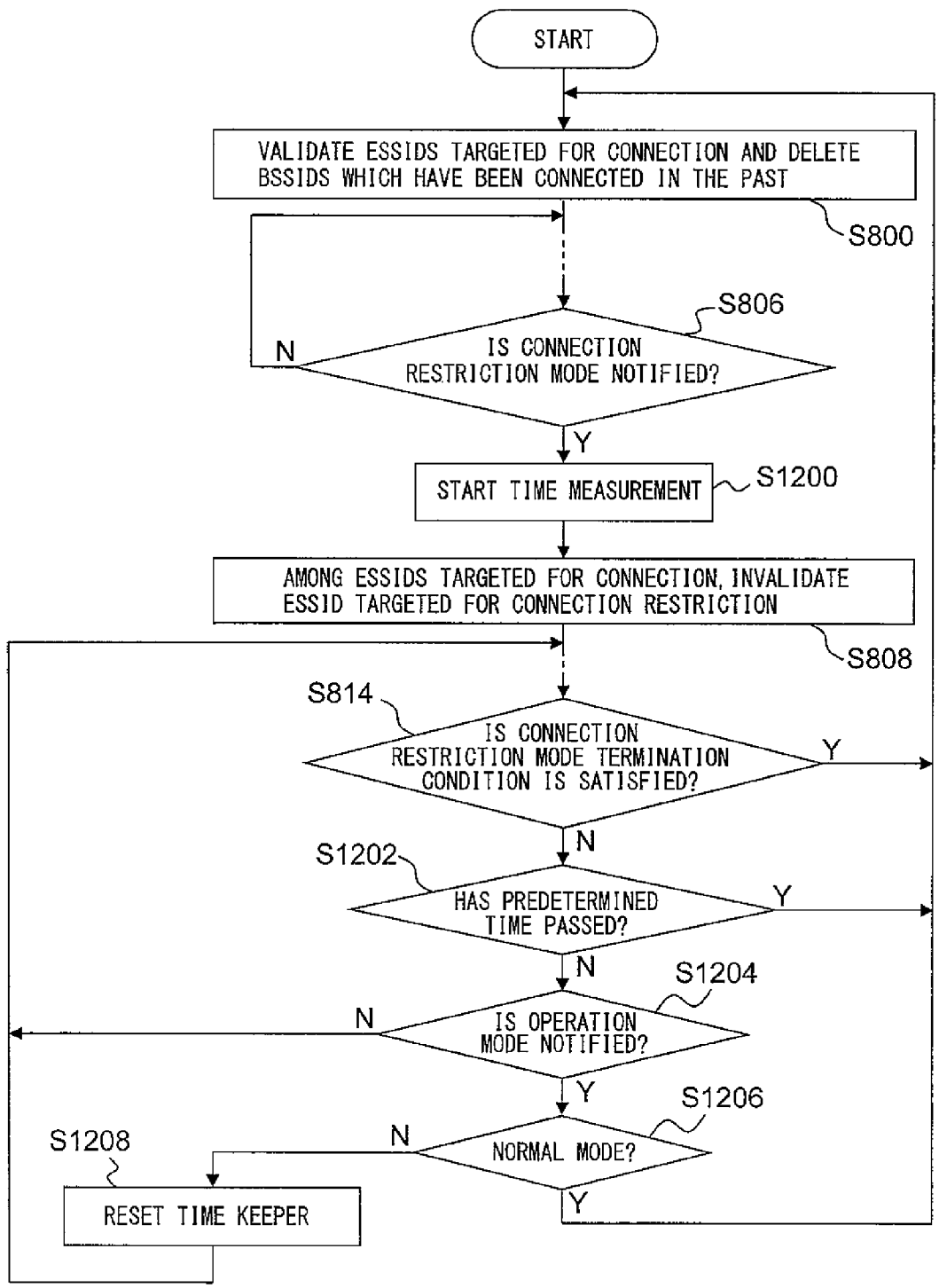
FIG. 12 is a view indicating an example of the operation flow of a connection control unit.
Figure 13:
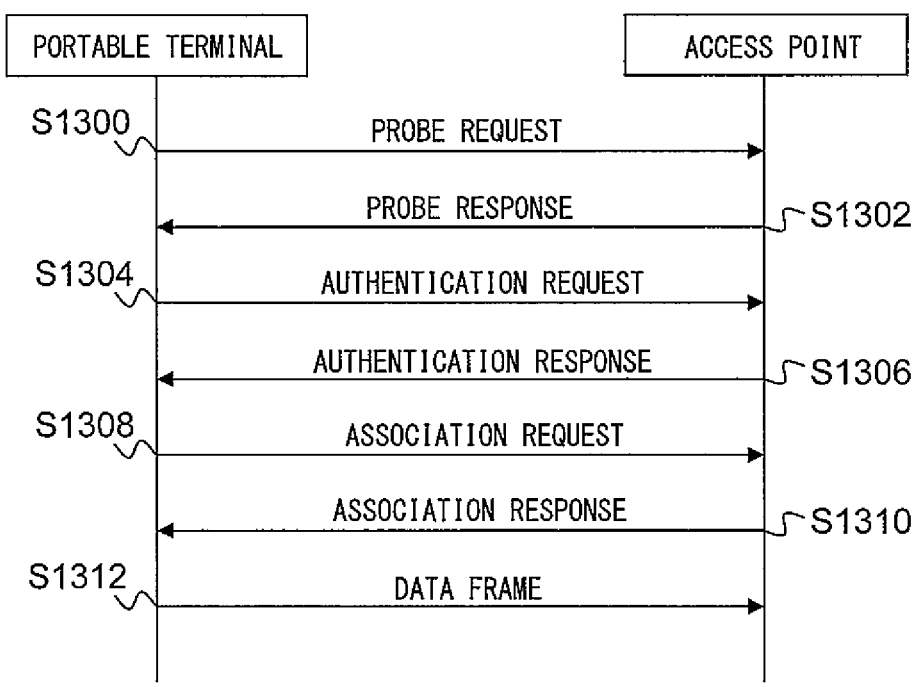
FIG. 13 is a view illustrating an example of the operating sequence of a conventional wireless LAN communication system.

FIG. 12 is a view indicating an example of the operation flow of the connection control unit 273". Since steps S800 to 804, and 808 to 814 in the operation flow are the same as those indicated in FIG. 8, the explanation thereof will be omitted below.

The connection control unit 273" shifts to a connection restriction mode when notified of an operation mode: "connection restriction mode" by the status detection unit 271" (step S806—Yes).

In the connection restriction mode, the connection control unit 273" refers to the configuration file stored in the storage unit 22" to acquire a time limit according to the connection control unit 273", and instructs the time measurement unit 274 to start measurement of time with the acquired time limit as a parameter (step S1200).

The connection control unit 273" shifts to the normal mode when notified by the time measurement unit 274 that a predetermined time has passed (step S1202-Yes).

When the connection control unit 273" is notified of an operation mode by the status detection unit 271" (step S1204—Yes), the connection control unit 273" judges whether or not the notified operation mode is "normal mode" (step S1206).

The connection control unit 273" also shifts to the normal mode when the notified operation mode is "normal mode" (step S1206—Yes).

On the other hand, when the notified operation mode is not "normal mode" (step S1206—No), the connection control unit 273" instructs the time measurement unit 274 to reset the time keeper (step S1208). Then, the connection control unit 273" returns to the process of judging the presence or absence of disconnection of the connection.

The connection control unit 273" also returns to the process of judging the presence or absence of disconnection of the connection unless notified of an operation mode from the status detection unit 271" (step S1204—No).

As explained above, providing a time limit in the operation in the connection restriction mode can resolve discordance of operation modes which can occur between the status detection unit 271" and the connection control unit 273" so that the overall processing unit 27' can operate properly.

The present invention is not limited to the present embodiment. For example, the content of the configuration file stored in the storage unit 22" can be changed by a user and/or a system. As a result, various communication environments and the like can be supported.

It should be understood that various changes, substitutions, and modifications can be made herein by those skilled in the art without departing from the spirit and scope of the present invention.

REFERENCE SIGNS LIST

1 Wireless LAN communication system
2 Portable terminal
21 Communication unit
22 Storage unit
23 GPS unit
24 Various sensors
25 Operation unit
26 Display unit
27 Processing unit
271 Status detection unit
272 Operating system
273 Connection control unit
274 Time measurement unit
3 Access point
4 Service area
5 Backbone network
6 Gateway
7 Authentication server
8 Internet
9 Server

What is claimed is:

1. A terminal for connecting by radio to an access point of a wireless local area network (LAN), the terminal being connected by radio to a current access point of the LAN, comprising:
a communication module for scanning to detect a plurality of accessible access points and connecting to one of the plurality of accessible access points;
a sensor for outputting data relating to movement of the terminal;
a status detector for determining whether the terminal is in a movement status based on the data outputted by the sensor, wherein the status detector activates the sensor when a predetermined starting condition is satisfied; and
a connection controller for targeting an accessible access point to connect to, wherein when it is determined by the status detector that the terminal is in a movement status and when an accessible access point identical to said current access point has been detected by the communication module during a plurality of scan times performed at predetermined time intervals and at a plurality of different locations where the terminal has moved to, the connection controller targets the detected accessible access point identical to said current access point for connection and keeps the connection by radio to said current access point.

2. The terminal according to claim 1, wherein the status detector stops the sensor when a predetermined status detection termination condition is satisfied.

3. The terminal according to claim 1, wherein the connection controller further targets an accessible access point, which belongs to a predetermined network among the accessible access points, for connection.

4. The terminal according to claim 1, wherein the connection controller further targets an accessible access point, which has been connected in the past among the accessible access points, for connection.

5. The terminal according to claim 1, wherein the connection controller targets all of the accessible access points for connection when a predetermined time has passed since the latest status detection by the status detector.

6. A method for controlling a terminal for connecting by radio to an access point of a wireless local area network (LAN), the terminal being connected by radio to a current access point of the LAN, wherein the terminal has a sensor for outputting data relating to movement of the terminal, the method comprising:
activating the sensor to output data relating to the movement of the terminal, when a predetermined starting condition is satisfied;
determining whether the terminal is in a movement status based on the data outputted by the sensor;
detecting a first group of accessible access points by scanning at a first location of the terminal;

detecting a second group of accessible access points by scanning after a predetermined time has passed and the terminal has moved from the first location to a second location detected by the sensor;

when it is determined that the terminal is in a movement status based on the data output by the sensor and when an accessible access point identical to said current access point has been detected, targeting a detected accessible access point in the second group of accessible access points identical to said current access point; and maintaining the connection to said current access point, when said current access point is included in both of the first group and the second group.

* * * * *